US012777043B1

(12) United States Patent
Prince et al.

(10) Patent No.: US 12,777,043 B1
(45) **Date of Patent: *Oct. 27, 2026**

(54) CONTROLLING ACCESS TO INTERNET RESOURCES FOR CERTAIN USER AGENTS BASED ON ONE OR MORE CONDITIONS BEING SATISFIED

(71) Applicant: CLOUDFLARE, INC., San Francisco, CA (US)

(72) Inventors: Matthew Browning Prince, Park City, UT (US); Dane Orion Knecht, Austin, TX (US); William Hayes Allen, III, Menlo Park, CA (US); Richard Simon Newton, Cambridge (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/403,935

(22) Filed: Nov. 30, 2025

Related U.S. Application Data

(63) Continuation of application No. 19/255,713, filed on Jun. 30, 2025.

(60) Provisional application No. 63/801,761, filed on May 7, 2025.

(51) Int. Cl.
*H04L 9/40* (2022.01)

(52) U.S. Cl.
CPC .......... *H04L 63/102* (2013.01); *H04L 63/126* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 10,270,792 | B1 * | 4/2019 | Shemesh | H04L 63/1433 |
| 11,184,390 | B2 | 11/2021 | Senecal et al. | |
| 11,374,945 | B1 * | 6/2022 | Senecal | H04L 63/1416 |
| 11,669,279 | B2 | 6/2023 | Pandian | |

(Continued)

OTHER PUBLICATIONS

International Search Report and Written Opinion, PCT App. No. PCT/US2025/057439, Feb. 19, 2026, 18 pages.

(Continued)

*Primary Examiner* — Michael Pyzocha
(74) *Attorney, Agent, or Firm* — NICHOLSON DE VOS WEBSTER & ELLIOTT LLP

(57) ABSTRACT

An intermediary server receives a request for a resource hosted at an origin server. The intermediary server determines whether the request includes a session identifier that can be used to verify an identity of the user agent. If it does not, the intermediary server determines a predicted identity of the user agent. If a policy that is used for controlling access to the internet resource for certain user agents based on condition(s) being satisfied is applicable, the intermediary server sends a response to the user agent that indicates access to the resource is contingent on the condition(s) being satisfied. A subsequent request that includes a session identifier can be received to verify the identity of the user agent. If the identity of the user agent is verified, the intermediary server determines whether the condition(s) have been satisfied. If they are, then the intermediary server allows access to the internet resource.

21 Claims, 16 Drawing Sheets

(56) References Cited

U.S. PATENT DOCUMENTS

| | | | | |
|---|---|---|---|---|
| 12,287,837 | B1 | 4/2025 | Kluonaitis et al. | |
| 2011/0060845 | A1 | 3/2011 | Jungck | |
| 2011/0124319 | A1* | 5/2011 | Fu | H04L 67/02 455/414.1 |
| 2015/0143453 | A1 | 5/2015 | Erb | |
| 2015/0324255 | A1 | 11/2015 | Kochunni et al. | |
| 2016/0080345 | A1* | 3/2016 | Safruti | H04L 67/02 726/6 |
| 2016/0094531 | A1 | 3/2016 | Unnikrishnan et al. | |
| 2016/0197956 | A1* | 7/2016 | Martini | H04L 63/104 726/1 |
| 2016/0299971 | A1* | 10/2016 | Ren | G06F 16/951 |
| 2017/0104829 | A1* | 4/2017 | Degroat | H04L 47/82 |
| 2017/0223049 | A1 | 8/2017 | Kuperman et al. | |
| 2020/0220875 | A1 | 7/2020 | Harguindeguy et al. | |
| 2021/0194969 | A1* | 6/2021 | Syed | G06F 16/951 |
| 2022/0029823 | A1 | 1/2022 | Law et al. | |
| 2022/0224716 | A1* | 7/2022 | Salji | H04L 63/1441 |
| 2022/0358289 | A1* | 11/2022 | Chen | G06F 18/2415 |
| 2022/0417222 | A1* | 12/2022 | Katta | H04L 63/1416 |
| 2022/0417266 | A1* | 12/2022 | Muthiah | H04L 63/1441 |
| 2023/0018506 | A1* | 1/2023 | Vilcinskas | G06F 16/953 |
| 2023/0106483 | A1* | 4/2023 | Sinn | G06F 16/951 707/709 |
| 2023/0412604 | A1 | 12/2023 | Pierce | |
| 2024/0107344 | A1* | 3/2024 | Papanikitas | G06F 11/3409 |
| 2024/0314142 | A1* | 9/2024 | Salji | G06N 7/01 |
| 2025/0055712 | A1* | 2/2025 | Kim | H04L 9/50 |
| 2025/0202919 | A1* | 6/2025 | Nagaraj | H04L 63/1425 |
| 2025/0220045 | A1* | 7/2025 | Bracken | H04L 63/10 |

OTHER PUBLICATIONS

Non-Final Office Action, U.S. Appl. No. 19/403,907, Mar. 2, 2026, 9 pages.

* cited by examiner

CONTROLLING ACCESS TO INTERNET RESOURCES FOR CERTAIN USER AGENTS BASED ON ONE OR MORE CONDITIONS BEING SATISFIED

CROSS-REFERENCE TO RELATED APPLICATIONS

This application is a continuation of U.S. application Ser. No. 19/255,713, filed Jun. 30, 2025, which claims the benefit of U.S. Provisional Application No. 63/801,761 filed May 7, 2025, which is hereby incorporated by reference.

FIELD

Embodiments of the invention relate to the field of network technology; and more specifically, to controlling access to internet resources for certain user agents based on one or more conditions being satisfied.

BACKGROUND

Historically, resource owners on the internet have allowed various user agents, including bots like search engine web crawlers, to access their content. This created a symbiotic relationship that benefited both parties; search engine bots use the content for search results and, in return, direct visitors to the resource owners' websites. However, bots that are related to artificial intelligence (AI) such as AI crawler bots and AI search bots break this symbiotic relationship. These types of bots use the information to train AI models, populate knowledge bases for AI-driven conversational interfaces, or generate summarized answers directly in their own platforms often without directing the visitors to the websites of the resource owners.

In many cases, AI bots can be significantly more resource-intensive than traditional bots. They may crawl websites at high frequencies, access large volumes of resources, and disregard crawl-delay directives in robots.txt. This can lead to increased server load, higher bandwidth costs, and even website performance degradation or outages for legitimate human users.

The robots.txt file is a file that provides guidance to bots about which parts of a website, if any, they are allowed to access. Different user agents can be specified in the robots.txt file. Compliance with the robots.txt file is typically voluntary, and while many reputable bots comply with the robots.txt file, others do not. Some services allow for the enforcement of the robots.txt file at the network level. However, using a robots.txt method for managing traffic from AI crawlers is inadequate. For instance, blocking entire bots is a blunt instrument that can potentially block beneficial services. Further, managing robots.txt files can become complicated and burdensome to the website owners.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
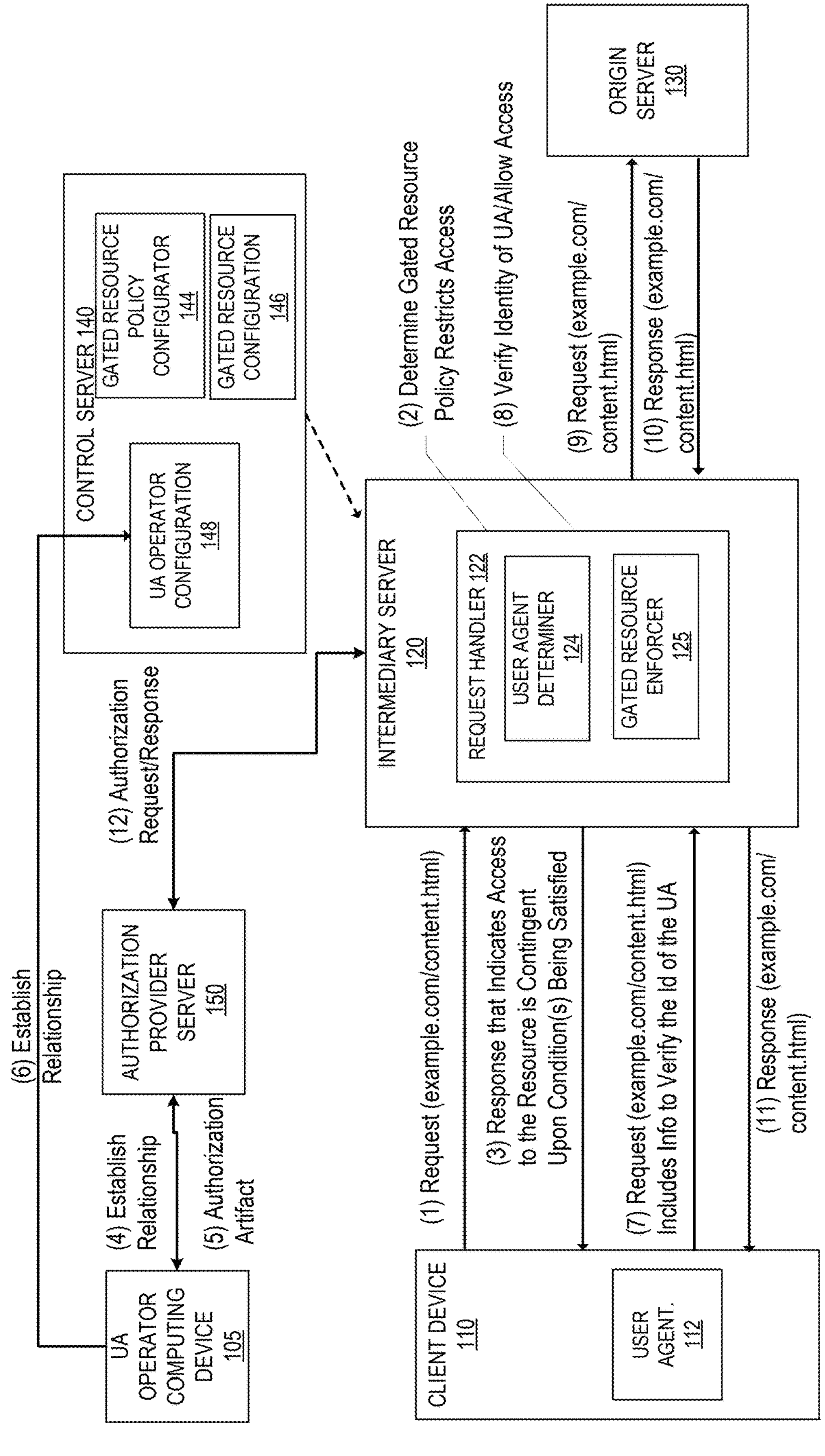
FIG. 1 illustrates an exemplary system for controlling access to internet resources for certain user agents based on one or more conditions being satisfied, according to an embodiment.

Controlling access to internet resources for certain user agents is described. An intermediary server, which is part of a gated resource service, prevents certain user agent(s) from accessing an internet resource unless one or more conditions have been satisfied. A gated resource policy is applicable to certain user agents, which may be configured by the resource owner. The intermediary server enforces a gated resource policy to control access based on user agent and one or more conditions being satisfied. Some user agents may be allowed access without satisfying the one or more conditions while other user agents are only allowed access if the one or more conditions are satisfied. The intermediary server identifies the user agent and, in an embodiment, requires requests for content to include information that allows the intermediary server to verify the identity of the user agent. As an example, the intermediary server may require the request to include a digital signature which verifiably identifies the user agent sending the request. The intermediary server then validates the digital signature before allowing access. As another example, the intermediary server may require a session be established and the request to include a session identifier that allows the intermediary server to verify the identity of the user agent before allowing access.

If a request for content from a particular user agent is received that does not allow the intermediary server to verify the identity of the user agent (e.g., the request does not include a digital signature associated with the user agent), the intermediary server blocks access to the content and transmits a response to the user agent that indicates that access to the resource is contingent on condition(s) being satisfied. This response can include a description of the condition(s) that are required to be satisfied to access the requested resource, a description of the operative boundaries for the access for the requested resource, and include directions to retrieve a file that includes instructions for establishing a relationship with an authorization provider and how to use the service.

The owner or operator of the user agent, which is sometimes referred to herein as a resource consumer, establishes a relationship with an authorization provider and receives an authorization artifact. The authorization artifact is used when establishing an authorization integration with the gated resource service. The resource consumer also establishes a relationship with the gated resource service such as an authorization integration with the gated resource service. The control server also allows the resource consumer to establish a unique cryptographic identity for their user agent. For instance, the control server may allow the resource consumer to identify a location where the public key(s) are for validating digital signatures included in requests.

If the intermediary server receives a subsequent request from that user agent that allows the intermediary server to verify the identity of the user agent (e.g., the request includes a cryptographic signature of the user agent), the intermediary server determines whether the condition(s) for access are satisfied, including determining whether the verified user agent is allowed access.

In some embodiments, the condition(s) can be dynamically generated by the gated resource service. For instance, the gated resource service can dynamically set condition(s) for access based at least in part on how recently the resource was created or updated (sometimes referred herein as the "freshness" of the resource). A resource that is part of an archive may have less stringent condition(s) for access compared to a resource that is newly created, for example. A resource owner can define condition tiers based on the freshness of the resource. An example tier structure could include: resources modified or created in the last 24 hours, those modified or created between 24 hours and a week ago, those modified or created between a week and a month ago, and those that are created or modified older than a month. This tier structure is an example and different tier structures can be defined.

In some embodiments, the intermediary server transmits a modified version of a resource to a user agent instead of the original resource. This modified version can be a markdown file, a JSON file, an XML file, or other structured file that is designed for easier consumption by the user agent. Metadata about the resource may also be included (e.g., resource creation time, resource update time, a source URL of the resource, a content type of the resource, the subject matter of the resource). For example, the intermediary server may modify an HTML document to remove elements such as cascading style sheets (CSS), scripts (e.g., JavaScripts), layouts (e.g., <div> structures, tables, etc.), form elements (e.g., input fields, buttons, dropdowns), media (e.g., images, video, iframes, flash objects), navigation menus, advertisements and pop-ups, comments in the HTML, meta tags and content within the <head> of the HTML. This simplifies the HTML document into a more text-focused format. The removal of media, such as images or videos, also prevents the unauthorized collection of images, videos, or other media that may be subject to rights ownership. Converting complex documents, such as HTML pages that include navigations, advertisements, scripts, etc., into the modified format, which is simpler, can help overcome limitations faced by large language models (LLMs) that often have context windows that are too small to process a complete webpage or website, and can reduce, thereby streamlining content consumption by user agents that feed LLMs.

Embodiments described herein mitigate issues caused by aggressive user agent bots by implementing a system where an intermediary server selectively controls access to internet resources. By requiring requests to include information that can be used to verify the identity of the sending user agent, the system ensures that only authorized user agents (e.g., authorized bots) can access the resources. This reduces the frequency and volume of bot traffic to the origin servers, consequently lowering origin server load and bandwidth usage. Further, less bandwidth is used in embodiments that transmit a modified version of the resource that removes elements from the original resource.

Another advantage of these embodiments is the scalability for resource consumers. Instead of managing individual relationships with each resource owner, embodiments allow for the resource consumers to use a centralized authorization provider to handle remote authorization. This means that once a consumer establishes a relationship with an authorization provider and the gated resource service, they can access multiple resources across different resource owners without the need for multiple individual relationships. This simplifies the process and saves time and resources for both consumers and resource owners.

FIG. 1 illustrates an exemplary system for controlling access to internet resources for certain user agents based on one or more conditions being satisfied, according to an embodiment. This control is sometimes called herein a gated resource service.

The intermediary server 120 is situated between client devices (e.g., the client device 110) and origin servers such as the origin server 130. The intermediary server 120 may be a reverse proxy server. Network traffic is received and processed through the intermediary server 120. For example, web traffic (e.g., HTTP requests/responses, HTTPS requests/responses, SPDY requests/responses, etc.) for a domain handled by the origin server 130 may be received and processed at the intermediary server 120. The origin server 130 is a computing device that serves and/or generates network resources (e.g., web pages, images, word processing documents, PDF files, movie files, music files, or other computer files). Although not illustrated in FIG. 1, the network resources handled by the origin server 130 may be stored separately from the device that responds to the requests. The intermediary server 120 is owned or operated by the entity providing the gated resource service and the origin server is typically owned or operated by a customer of the gated resource service. These customers are sometimes referred to herein as resource owners.

Each client device is a computing device that transmits and receives network traffic. Such a computing device can be a laptop, desktop, smartphone, mobile phone, tablet, gaming system, set top box, internet-of-things (IoT) device, wearable device, or other network device. Each client device executes a user agent that initiates requests for network resources. Example user agents include browsers, bots, command-line tools, mobile applications, and scripts. A bot is a type of user agent that operates autonomously to perform a particular task. Example bots include: web crawlers that may access pages for search engines; AI or machine learning crawlers that access pages for use in AI training or models, surface search results, and to complete user-initiated tasks; command-line tools (e.g., cURL); mobile applications; and scripts. A user agent identifies itself through a user agent string. A malicious user agent may use fake or misleading user agent strings to impersonate other legitimate user agents to try to prevent detection. In FIG. 1, the client device 110 executes the user agent 112.

The intermediary server 120 may be one of many servers of a distributed cloud computing network. Such a distributed cloud computing network can include multiple data centers that each have one or more intermediary servers. Each data center can also include one or more control servers, one or more DNS servers (e.g., one or more authoritative name servers, one or more proxy DNS servers), and/or one or more other pieces of network equipment such as router(s), switch(es), and/or hubs. Network traffic is received at the distributed cloud computing network from client devices such as the client device 110. The network traffic may be destined to a customer of the distributed cloud computing network and served by the origin server 130. The traffic may be received at the distributed cloud computing network in different ways. For instance, IP address(es) of the origin network belonging to the customer may be advertised (e.g., using Border Gateway Protocol (BGP)) by the distributed cloud computing network instead of being advertised by the origin network. As another example, the data centers of the distributed cloud computing network may advertise a different set of anycast IP address(es) on behalf of the origin and map those anycast IP address(es) to the origin IP address(es). This causes IP traffic to be received at the distributed cloud computing network instead of being received at the origin network. As another example, network traffic for a hostname of the origin network may be received at the distributed cloud computing network due to a DNS request for the hostname resolving to an IP address of the distributed cloud computing network instead of resolving to an IP address of the origin network. As another example, client devices may be configured to transmit traffic to the distributed cloud computing network. For example, an agent on the client device (e.g., a VPN client) may be configured to transmit traffic to the distributed cloud computing network. As another example, a browser extension or file can cause the traffic to be transmitted to the distributed cloud computing network. In any of the above scenarios, the network traffic from the client device 110 may be received at a particular data center that is determined to be closest to the client device 110 in terms of routing protocol configuration (e.g., Border Gateway Protocol (BGP) configuration) according to an anycast implementation as determined by the network infrastructure (e.g., router(s), switch(es), and/or other network equipment between the client device 110 and the datacenters) or by a geographical load balancer.

The control server 140 allows for configuration of the gated resource service. For example, the control server 140 includes the gated resource policy configurator 144 that allows a resource owner to configure the gated resource service. The configuration is stored in the gated resource configuration 146. The gated resource policy configurator 144 may allow the resource owner to enable or disable the service for entire zone(s) and/or specific resource(s).

The gated resource policy configurator 144 allows the resource owner to configure one or more gated resource policies for their resources. A gated resource policy includes the condition(s) that are required for accessing resource(s), and specifies the operative boundaries for access such as the duration of the access and/or the number of accesses allowed. For instance, the resource owner can specify different access models such time-based, usage-based, or a combination of time-based and usage-based. When the operative boundaries have been exceeded (e.g., the time has expired or the number of accesses has met the limit), the user agent must satisfy the condition(s) again for further access. The gated resource policy configurator 144 allows the resource owner to apply a gated resource policy to a zone, hostname, or to a path (a particular resource). The gated resource policy configurator 144 allows the resource owner to apply a gated resource policy to different resource types, such as PDFs, HTML documents, images, and video. The gated resource policy configurator 144 allows the resource owner to apply the policy to different user agents, or types of user agents.

As an example, a condition may be an agreement of one or more terms between the resource consumer and the resource owner for the transfer of the resource. The terms may include an agreement of an exchange of value from the resource consumer to the resource owner, and/or stipulations regarding how the resource is allowed to be used by the resource consumer. Such stipulations can include: whether the resource is allowed to be used for training a machine learning model, whether the resource is allowed to be used for search, whether the data from the resource can be used by an agent, and/or whether the resource can be used to make derivative works. Different stipulations can apply to different parts of the resource. For example, a part of a resource with user generated content such as comments may have different allowed uses compared to a part of the resource that is article text. As another example, a condition may be acceptance of an operative boundary that limits the access to the resource. An operative boundary can be time-based, usage-based, or a combination of time-based and usage-based. For example, the resource owner can define that the resource can be accessed for only a single access, multiple accesses, multiple accesses within a time period, or any number of accesses within a time period. In a single access form, only a single retrieval of the resource is allowed by the user agent per acceptance of the term(s). In multiple accesses form, N number of accesses of the resource are allowed, or a particular hostname or zone, where Nis more than one. In multiple accesses within a time period form, N number of accesses of the resource, or a particular hostname or zone, for a time period is allowed. In an any access within a period form, any number of accesses of the resource, or a particular hostname or zone, for a time period is allowed.

In an embodiment, a condition for accessing a resource depends at least in part on how recently the resource was created or last updated (the freshness of the resource). For example, a resource owner can define condition tiers based on the freshness of the resource. An example tier structure could include: resources modified or created in the last 24 hours, those modified or created between 24 hours and a week ago, those modified or created between a week and a month ago, and those that are created or modified older than a month. This tier structure is an example and different tier structures can be defined.

FIG. 1 shows an example of the operations of the system. Prior to these operations, the owner or operator of the hostname that is hosted by the origin server 130 (the resource owner) has configured the gated resource service including configuring a gated resource policy. At operation 1, the user agent 112 transmits a request (e.g., an HTTP or HTTPS request) that is received by the intermediary server 120 and processed by the request handler 122. The request is for a resource hosted by the origin server 130. In the example of FIG. 1, the request is a GET request for the resource at the URL example.com/content.html.

The request handler 122 determines, at operation 2, that a gated resource policy that restricts access to the requested resource is applicable to the request. If a gated resource policy did not apply to the request, then no further gated resource policy processing is performed. In the example of FIG. 1, a gated resource policy applies to the request.

As described earlier, the gated resource policy may only be applicable to certain user agents as configured by the resource owner. For instance, the gated resource policy may be applicable only to user agents that are bots associated with artificial intelligence (AI) such as AI crawler bots and AI search bots. If the gated resource policy is applicable to one or more user agent(s) and not other(s), the request handler 122 determines the user agent of the request. After determining the user agent of the request, the request handler 122 determines whether there is a gated resource policy that is applicable to the determined user agent. If there is such a gated resource policy, the request handler 122 determines whether the request satisfies the gated resource policy (e.g., meets all the condition(s) configured for the policy) and if not blocks the request with information that notifies the user agent 112 that compliance with the condition(s) must occur to gain access to the resource.

The user agent determiner 124 of the request handler 122 can perform a user agent detection and verification process to determine at least a predicted identity of the user agent of the request. The user agent determiner 124 can determine the reported user agent from the user agent string in the User-Agent header of the request. The string typically includes information such as the name of the user agent, the version, the operating system, and can include other information like rendering engine or device type. However, the reported user agent may not accurately represent the actual user agent. For example, the user agent string could be falsified or misleading, such as when a malicious user agent tries to impersonate another user agent to avoid detection. In an embodiment, determining the predicted identity of the user agent includes the user agent determiner 124 verifying whether the reported user agent is likely authentic (e.g., is not falsified or spoofed). For example, the user agent determiner 124 may analyze the reported user agent for inconsistencies or anomalies that deviate from known patterns of user agents. This can include checking the user agent string against known user agents and their corresponding attributes such as browser version, operating system, and/or device type. The user agent determiner 124 can also cross-reference the user agent string with other request headers such as the Accept and/or Accept-Language headers to determine whether there are any inconsistencies (e.g., a user agent that is reporting as a browser without an accept-encoding may be abnormal). The user agent determiner 124 can also examine the behavior of the user agent such as the sequence of requests and the timing, whether it loads scripts, etc., to detect patterns that may be indicative of malicious bots. The user agent determiner 124 can also cross-check the reported user agent against known IP addresses associated with known user agents. For example, the user agent determiner 124 can compare the IP address of the incoming request to a database of IP addresses that are known to correspond to specific user agents. If the IP address does not match a known entry for the reported user agent, the user agent may be masquerading as another user agent. The analysis may use a machine learning model that is trained on request data at the distributed cloud computing network that analyzes patterns to distinguish human behavior from bot activity to determine a likelihood of the request being from a bot. The user agent determiner 124 can also determine whether the user agent is a likely legitimate bot, a likely malicious bot, or an unknown bot. This can include checking the bot against known bots (e.g., known search engine bots, known advertising bots, known search engine optimization bots, known aggregator bots, known AI crawler bots, known AI search bots, known monitoring bots, known security bots, and known webhooks bots). The user agent determiner 124 can determine the likely identity of the bot by cross-referencing the IP address and user agent string with the entries in the known bot lists. Further, the user agent determiner 124 can examine the behavior of the bot to determine whether it aligns with the expected behavior of a known bot.

In an embodiment, the user agent determiner 124 can verify the identity of the user agent using information included in the request. For example, the resource consumer can register their user agent with the gated resource service to establish a unique cryptographic identity for their user agent and authenticate itself using a digital signature. Registering a user agent can include providing the public key(s) for validating the digital signature or providing a location (e.g., a URL) where the public key(s) can be found. The user agent can create the digital 1 signature using a private key associated with the user agent and include the signature in the request (e.g., in a signature header). The request may also include a location (e.g., a URL) where the public key that corresponds to the private key can be found. The signature may be over the host of the request and optionally the location of the public key. The user agent determiner 124 receives the request and validates the digital signature. This allows the user agent determiner 124 to verify that a particular user agent was the one who sent the request. As another example, a user agent may be required to authenticate with the gated resource service and receive a session identifier (e.g., a token or a cookie containing a session identifier). The session identifier may be included in subsequent requests, which can be verified by the user agent determiner 124, which can be used to verify that a particular user agent was the one who sent the request.

In an embodiment, a verified user agent is required to access content protected by the gated resource service. In such an embodiment, the user agent determiner 124 determines whether the request includes information for verifying the identity of the user agent. For example, if a digital signature is used for verifying the identity of the user agent, the user agent determiner 124 looks for the digital signature in the request. As another example, if a session identifier is used for verifying the identity of the user agent, the user agent determiner 124 looks for the session identifier. If such information is included in the request, then the user agent determiner 124 verifies the identity of the user agent. For example, if the request includes a digital signature, the user agent determiner 124 validates the signature and looks up the corresponding user identity. As another example, if the request includes a session identifier, the user agent determiner 124 looks up stored session state and determines whether the identifier is expired. If such information is not included in the request, then the request handler transmits a response to the user agent that indicates access to the resource is contingent upon condition(s) being satisfied. This response is sometimes referred to herein as a gated resource response.

The gated resource enforcer 125 of the request handler 122 determines whether the request satisfies the gated resource policy (e.g., meets all the condition(s) configured for the policy). As an example, a condition may be an agreement of one or more terms between the resource consumer and the resource owner for the transfer of the resource. The terms may include an agreement of an exchange of value from the resource consumer to the resource owner, and/or stipulations regarding how the resource is allowed to be used by the resource consumer. Such stipulations can include: whether the resource is allowed to be used for training a machine learning model, whether the resource is allowed to be used for search, whether the data from the resource can be used by an agent, and/or whether the resource can be used to make derivative works. Different stipulations can apply to different parts of the resource. For example, a part of a resource with user generated content such as comments may have different allowed uses compared to a part of the resource that is article text. As another example, a condition may be acceptance of an operative boundary that limits the access to the resource. An operative boundary can be time-based, usage-based, or a combination of time-based and usage-based. For example, the resource owner can define that the resource can be accessed for only a single access, multiple accesses, multiple accesses within a time period, or any number of accesses within a time period. In a single access form, only a single retrieval of the resource is allowed by the user agent per acceptance of the term(s). In multiple accesses form, N number of accesses of the resource are allowed, or a particular hostname or zone, where Nis more than one. In multiple accesses within a time period form, N number of accesses of the resource, or a particular hostname or zone, for a time period is allowed. In an any access within a period form, any number of accesses of the resource, or a particular hostname or zone, for a time period is allowed.

The condition(s) may be included in the gated resource response. Alternatively, or additionally, the condition(s) may be available through the control server 140 that can be accessed by the resource consumer. The acceptance of the term(s) may be found in the request itself. For instance, the request may include a header that indicates an acceptance of the one or more terms. Alternatively, the acceptance of the term(s) may be found in the UA operator configuration 148 (e.g., pre-acceptance of certain term(s)).

If the request does not satisfy the gated resource policy, the gated resource enforcer 125 blocks access to the resource and a response is transmitted to the user agent 112 that indicates access to the resource is contingent upon condition (s) being satisfied, at operation 3. The gated resource response may have a 402 HTTP status code. The gated resource response can include a description of the condition (s) that are required to be satisfied to access the requested resource, a description of the operative boundaries for the access for the requested resource and include directions to retrieve a file that includes instructions for using the gated resource service. In the example of FIG. 1, the request in operation 1 does not satisfy the gated resource policy and/or is not from a verified user agent. Although not shown in FIG. 1, the user agent 112 may download the file that includes instructions for using the gated resource service, including establishing a relationship with the authorization provider.

In an embodiment, the gated resource response is dynamically generated by the intermediary server 120 based on the resource that is being requested. For example, the condition (s) described in the gated resource response can be generated using the condition tiers defined by the resource owner and the freshness of the resource. The intermediary server 120 may determine the freshness of the resource in different ways. For instance, the intermediary server 120 may access the resource and inspect a Last-Modified header which indicates the date and time of the last modification. As another example, the intermediary server 120 may inspect an Entity Tag (ETag) header that provides a version identifier and verify the version identifier with the version identifier in cache. As another example, the intermediary server 120 may detect updates by generating a hash of the resource and comparing the hash with a previously stored hash for the same resource, where a difference indicates an update.

In an embodiment, the gated resource response includes a summary of the resource that is requested. The summary may be generated using an AI model (e.g., an LLM model) that operates on the resource and summarizes its content. The summary of the content provides more information for the user agent, or the resource consumer, to determine whether it wants to proceed with acquiring the resource and complying with the necessary condition(s). The summary of the resource may also be available on a website provided by the gated resource service that is accessible to the resource consumer. This website can also include other summaries of other resources that the user agent 112 has requested.

In the example of FIG. 1, at operation 4, the owner or operator of the user agent 112 (the resource consumer) establishes a relationship with the authorization provider through the authorization provider server 150 using the user agent operator computing device 105. The relationship allows the authorization provider to provide authorization for accessing resources. The authorization provider server 150 provides an authorization artifact to the user agent operator computing device 105 of the resource consumer at operation 5. The authorization artifact is uniquely associated with the account of the resource consumer. The resource consumer establishes a relationship with the gated resource service at operation 6. For example, the control server 140 allows the resource consumer to establish an authorization integration with the gated resource service. The authorization artifact is used when establishing the authorization integration. The authorization artifact provided by the authorization provider server 150 for the resource consumer can be used by the intermediary server 120 for multiple resource owners (e.g., all resource owners that are using the gated resource service). Thus, instead of needing to establish a relationship with each resource owner, the resource consumer can establish a single relationship with the authorization provider and the gated resource service that applies to multiple resource owners. The control server 140 also allows the resource consumer to establish a unique cryptographic identity for their user agent. For instance, the control server may allow the resource consumer to identify a location where the public key(s) are for validating digital signatures included in requests.

The user agent 112 can resubmit the request and include information for verifying the identity of the user agent. For example, the request can include a header that includes a digital signature, signed by a private key associated with the user agent 112. The request can also include a header that specifies the location (e.g., a URL) where the public key that corresponds to the private key can be found. The request can also include a header that specifies the components that were included in the string that was signed and may also include a timestamp of when the signature was created, a timestamp when the signature is considered expired, and an identifier for the public key that should be used to verify the signature. As another example, the request can include a session identifier (e.g., in a token or a cookie) that allows the intermediary server 120 to verify the identity of the user agent. Thus, at operation 7, the user agent 112 transmits the request for the resource, where this request includes information for verifying the identity of the user agent. The request may also include an acceptance of term(s) as a condition for accessing the request. This may be included in a header of the request.

At operation 8, the request handler 122 verifies the identity of the user agent 112 using the information included in the request. For instance, if the user agent 112 included a signature in the request, the request handler 122 verifies the signature using the public key associated with the user agent 112. If the request includes a session identifier, the request handler 122 looks up stored session state and determines whether the identifier is expired.

After verifying the identity of the user agent, the gated resource enforcer 125 enforces the gated resource policy that is applicable to the resource and the user agent. Enforcing the gated resource policy includes determining whether the one or more conditions are satisfied. If, based on enforcing the gated resource policy, the user agent 112 is allowed to access the resource, then the request handler 122 retrieves the resource. Retrieving the resource may include retrieving the resource from the origin server 130 (e.g., transmitting the request to the origin server 130 and receiving a response containing the resource from the origin server 130) or retrieving the resource from cache that is available to the request handler 122. In the example of FIG. 1, the request handler 122 transmits a request for the resource to the origin server 130 at operation 9, and receives a response at operation 10 from the origin server 130 that includes the requested content. The request handler 122 transmits the response with the resource to the user agent 112 at operation 11. The response transmitted to the user agent 112 may include a header that specifies the agreed-upon term(s).

In an embodiment, the request handler 122 transmits a modified resource to the user agent 112 instead of the original resource. For instance, the request handler 122 may modify the retrieved resource to make a machine-readable form that is designed specifically for the type of the user agent 112, such as a markdown file, a JSON file, an XML file, or other structured file that is designed for easier consumption by the user agent. For instance, if the requested resource is a web page (e.g., an HTML document), the request handler 122 can modify the web page to remove elements such as cascading style sheets (CSS), scripts (e.g., JavaScripts), layouts (e.g., <div> structures, tables, etc.), form elements (e.g., input fields, buttons, dropdowns), media (e.g., images, video, iframes, flash objects), navigation menus, advertisements and pop-ups, comments in the HTML, meta tags and content within the <head> of the HTML. This simplifies the HTML document into a more text-focused format, which can be easier processed by user agents, such as user agents that are used to feed AI models.

The request handler 122 may reflect the access such as causing data of the accounts of the resource consumer and the resource owner to be updated (e.g., causing the value exchange from the resource consumer to the resource owner). For instance, at operation 12, the request handler 122 can transmit an authorization request to the authorization provider server 150 that includes the authorization artifact, and it receives an authorization response that indicates whether authorization was approved.

Figure 2:
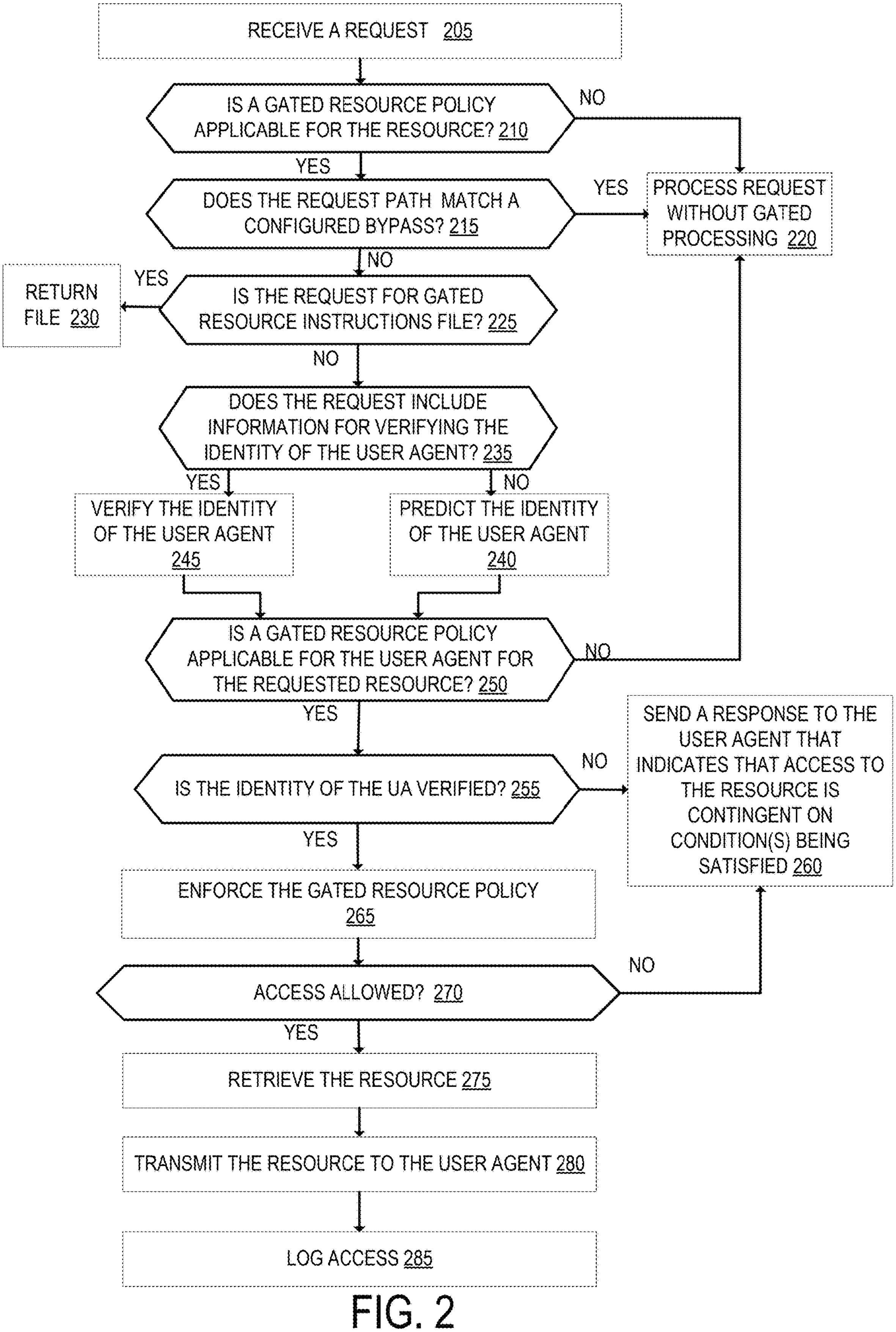
FIG. 2 is a flow diagram that illustrates exemplary operations performed for controlling access to internet resources for certain user agents based on one or more conditions being satisfied according to an embodiment.

FIG. 2 is a flow diagram that illustrates exemplary operations performed for controlling access to internet resources for certain user agents based on one or more conditions being satisfied according to an embodiment. The operations of FIG. 2 are described with respect to the exemplary embodiment of FIG. 1. However, the operations of FIG. 2 can be performed by different embodiments from FIG. 1, and the embodiment of FIG. 1 can perform different operations from FIG. 2. Prior to the operations of FIG. 2, the resource owner has configured the gated resource service including configuring a gated resource policy that restricts access for certain user agents.

At operation 205, the request handler 122 of the intermediary server 120 receives a request from the user agent 112 of the client device 110. The request is for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource. The request handler 122 determines the hostname of the requested resource. The request handler 122 determines whether a gated resource policy is applicable for the requested resource at operation 210. If there is such a policy, then operation 215 is performed. If there is not such a policy, then operation 220 is performed where the request is processed without the gated processing described further in FIG. 2. There may be a policy that defines a configured bypass path where the gated processing is not performed. If, at operation 215, the request path matches a configured bypass, then the request is processed without the gated processing described further in FIG. 2. If the request path does not match a configured bypass, then operation 225 is performed.

At operation 225, the request handler 122 determines whether the request is for a file that provides instructions to the user agent 112 on how to use the gated resource service. This file is sometimes referred to herein as the gated resource instructions file. The gated resource instructions file may be a text file, a JSON file, an XML file, or other structured file format. The gated resource instructions file includes instructions that indicate that a relationship needs to be created between the resource consumer and the authorization provider. The gated resource instructions file may include a link to create the relationship that is dynamically generated by the request handler 122. The gated resource instructions file may include instructions to implement digital signatures for interactions with the gated resource service. The gated resource instructions file is machine readable such that the user agent 112 may act on this file without human intervention if a relationship has already been created between the resource consumer and the authorization provider. In an embodiment, the gated resource instructions file specifies the condition(s) that must be met to gain access to the requested file. If the request is for the gated resource instructions file, then the request handler 122 returns the file to the user agent 112 at operation 230. If the request is not for the gated resource instructions file, then operation 235 is performed.

In an embodiment, the request handler 122 only allows access to a resource protected by the gated resource service from a particular user agent or category of user agent if the identity of that user agent is verified. In an embodiment, the user agent authenticates themselves using a digital signature included in the request. For example, the user agent can create a digital signature using a private key associated with the user agent and include that signature in the request (e.g., in a signature header). The request may also include a location (e.g., a URL) where the public key that corresponds to the private key can be found. The signature may be over the host of the request and optionally the location of the public key. The request handler 122 receives the request and validates the digital signature. As another example, a user agent may be required to authenticate with the gated resource service and receive a session identifier (e.g., a token or a cookie containing a session identifier). The session identifier may be included in subsequent requests, which can be verified by the request handler 122.

The request handler 122 determines whether the request includes information for verifying the identity of the user agent at operation 235. For example, if a digital signature is used for verifying the identity of the user agent, the request handler 122 looks for the digital signature in the request. As another example, if a session identifier is used for verifying the identity of the user agent, the request handler 122 looks for the session identifier. If such information is included in the request, then operation 245 is performed. At operation 245, the request handler 122 verifies the identity of the user agent. For example, if the request includes a digital signature, the request handler 122 validates the signature. As another example, if the request includes a session identifier, the request handler 122 looks up stored session state and determines whether the identifier is expired. Operations move from operation 245 to operation 250.

If the request does not include information for verifying the identity of the user agent, then operation 240 is performed. At operation 240, the user agent determiner 124 of the request handler 122 determines a predicted identity of the user agent of the request like as previously described. The user agent determiner 124 may also determine the category of the user agent based on the verified identity or the predicted identity. For example, the user agent determiner 124 can compare the determined user agent against a predefined list of user agents that are organized into categories. Example categories include web browsers, mobile browsers, email clients, media players, IoT devices, libraries and frameworks, search engine crawlers, advertising bots, search engine optimization bots, aggregator bots, AI crawler bots, AI search bots, monitoring bots, security bots, webhooks bots, and unknown. If the determined user agent matches an entry within a specific category, the user agent determiner 124 applies that category to the user agent. If no match is found, the user agent determiner 124 applies an unknown category to the user agent. Operations move from operation 240 to operation 250.

The gated resource processing may be applicable only to certain one or more user agents, which may be configured by the resource owner. For example, the gated resource processing may be applicable only to user agents that are associated with artificial intelligence (AI) bots such as AI crawler bots and AI search bots. The type of user agents and/or the specific user agents in which the gated resource processing applies may be configured by the resource owner. In the example of FIG. 2, the gated resource policy is applied to certain user agent(s) and not other(s). Thus, at operation 250, the request handler 122 determines whether a gated resource policy is applicable for the user agent for the resource. For instance, the request handler 122 analyzes the gated resource configuration 146 for the hostname of the request and determines whether a gated resource policy applies for the determined user agent. If a gated resource policy does not apply, then the request handler 122 continues processing the request without further gated processing at operation 220. If a gated resource policy applies, then operation 255 is performed.

In an embodiment, the request handler 122 only allows access to a resource protected by the gated resource service from a particular user agent or category of user agent if the identity of that user agent is verified. Thus, at operation 255, the request handler determines whether the identity of the user agent is verified (e.g., verified in operation 245). If the identity of the user agent is not verified, then operation 260 is performed. At operation 260, the request handler 122 transmits a response to the user agent 112 that indicates access to the resource is contingent upon condition(s) being satisfied. This response is sometimes referred to herein as a gated resource response. The gated resource response may have a 402 HTTP status code. The gated resource response can include a description of the condition(s) that are required to be satisfied to access the requested resource, a description of the operative boundaries for the access for the requested resource, and include directions to retrieve a file that includes instructions for using the gated resource service.

If the identity of the user agent is verified, then at operation 265, the gated resource policy is enforced. Enforcing the gated resource policy includes determining whether the one or more conditions are satisfied. As an example, a condition may be an agreement of one or more terms between the resource consumer and the resource owner for the transfer of the resource. The terms may include an agreement of an exchange of value from the resource consumer to the resource owner, and/or stipulations regarding how the resource is allowed to be used by the resource consumer. Such stipulations can include: whether the resource is allowed to be used for training a machine learning model, whether the resource is allowed to be used for search, whether the data from the resource can be used by an agent, and/or whether the resource can be used to make derivative works. As another example, a condition may be acceptance of an operative boundary that limits the access to the resource. An operative boundary can be time-based, usage-based, or a combination of time-based and usage-based. For example, the resource owner can define that the resource can be accessed for only a single access, multiple accesses, multiple accesses within a time period, or any number of accesses within a time period. In a single access form, only a single retrieval of the resource is allowed by the user agent per acceptance of the term(s). In multiple accesses form, N number of accesses of the resource are allowed, or a particular hostname or zone, where Nis more than one. In multiple accesses within a time period form, N number of accesses of the resource, or a particular hostname or zone, for a time period is allowed. In an any access within a period form, any number of accesses of the resource, or a particular hostname or zone, for a time period is allowed.

The condition(s) may be included in the gated resource response. Alternatively, or additionally, the condition(s) may be available through the control server 140 that can be accessed by the resource consumer. The acceptance of the term(s) may be found in the request itself. For instance, the request may include a header that indicates an acceptance of the one or more terms. Alternatively, the acceptance of the term(s) may be found in the UA operator configuration 148 (e.g., pre-acceptance of certain term(s)).

Based on enforcing the gated resource policy, the request handler 122 determines whether the user agent is allowed to access the resource at operation 270. If access is not allowed, then the request handler 122 sends a response to the user agent that indicates that access to the resource is contingent on condition(s) being satisfied in operation 260 (the gated resource response). If access is allowed, then the request handler 122 retrieves the resource at operation 275. Retrieving the resource may include retrieving the resource from the origin server 130 (e.g., transmitting the request to the origin server 130 and receiving a response containing the resource from the origin server 130) or retrieving the resource from cache that is available to the request handler 122. The request handler 122 transmits the retrieved resource to the user agent 112 at operation 280.

In an embodiment, the request handler 122 transmits a modified resource to the user agent 112 instead of the original resource. For instance, the request handler 122 may modify the retrieved resource to make a machine-readable form that is designed specifically for the type of the user agent 112, such as a markdown file, a JSON file, an XML file, or other structured file that is designed for easier consumption by the user agent. For instance, if the requested resource is a web page (e.g., an HTML document), the request handler 122 can modify the web page to a markdown file. to remove elements such as cascading style sheets (CSS), scripts (e.g., JavaScripts), layouts (e.g., <div> structures, tables, etc.), form elements (e.g., input fields, buttons, dropdowns), media (e.g., images, video, iframes, flash objects), navigation menus, advertisements and pop-ups, comments in the HTML, meta tags and content within the <head> of the HTML. This simplifies the HTML document into a more text-focused format, which can be easier processed by user agents, such as user agents that are used to feed AI models.

The request handler 122 may log the access at operation 285. Logging the access may include logging the time of the access, the user agent making the request, the category of the user agent making the request, the zone of the resource, and the name or path of the resource. The request handler 122 may reflect the access such as causing data of the accounts of the resource consumer and the resource owner to be updated (e.g., causing the value exchange from the resource consumer to the resource owner).

Figure 3A:
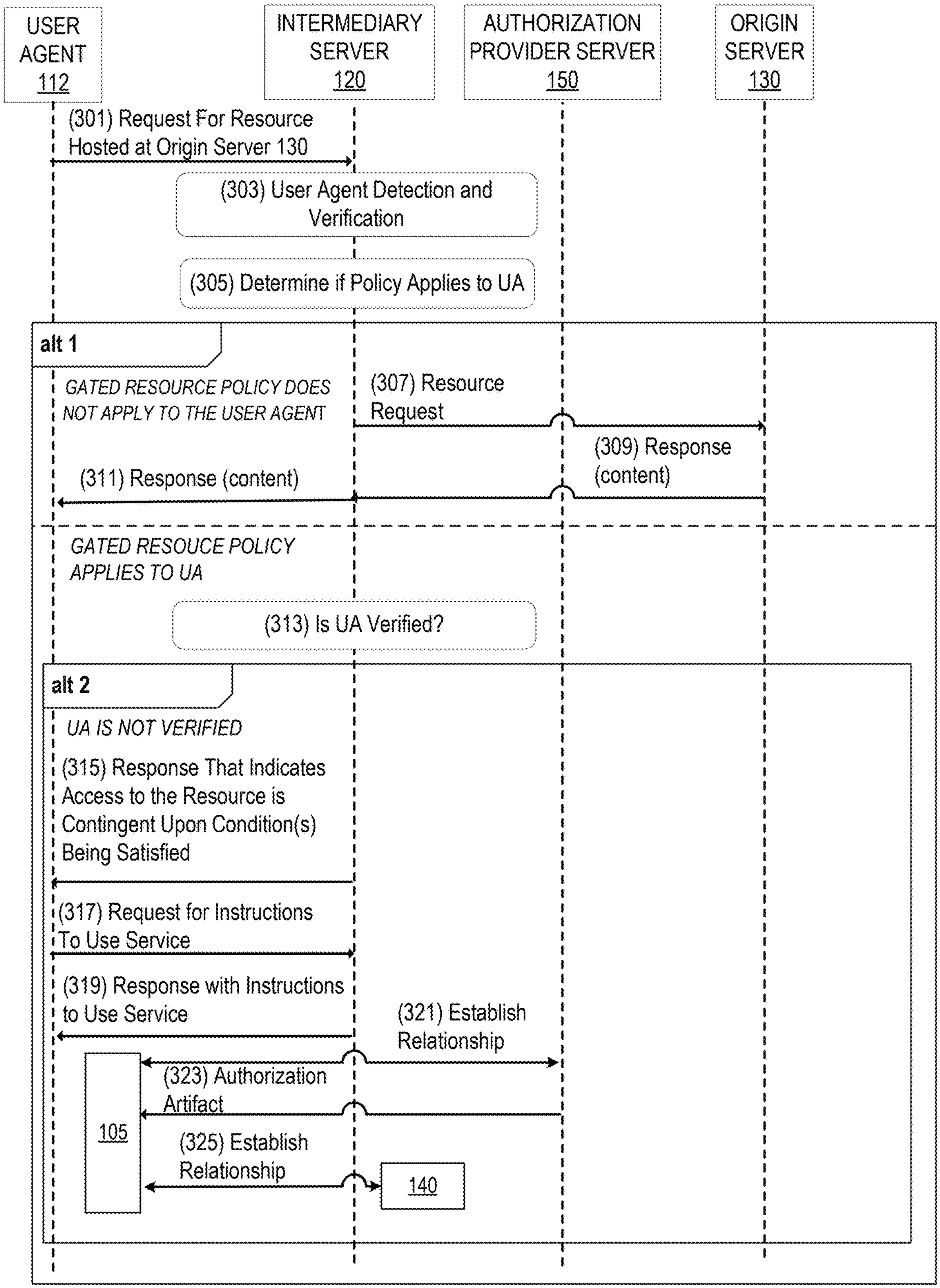
FIG. 3A is a first portion of a sequence diagram that illustrates exemplary operations for controlling access to internet resources for certain user agents upon one or more conditions being satisfied according to an embodiment.
Figure 3B:
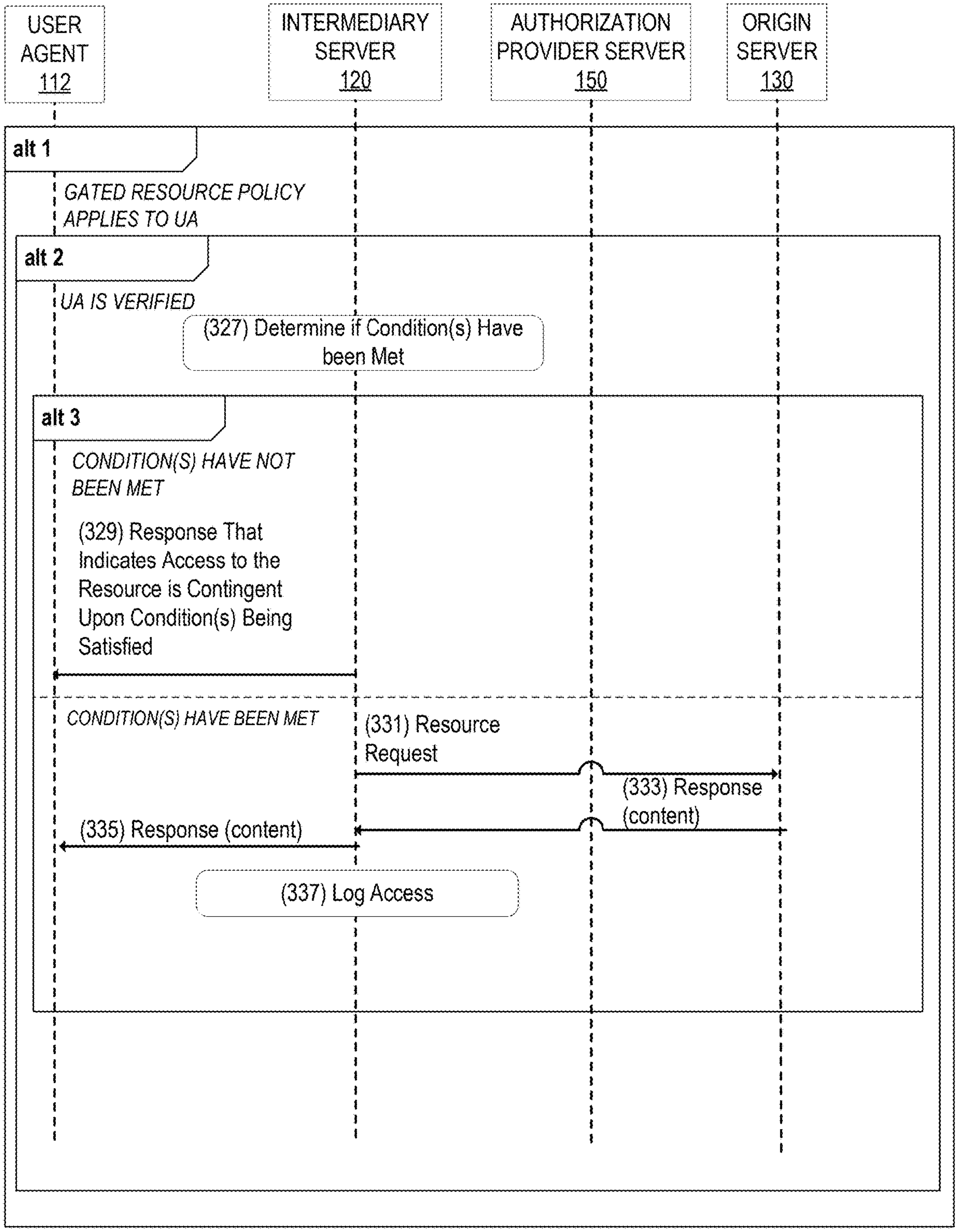
FIG. 3B is a second portion of a sequence diagram that illustrates exemplary operations for controlling access to internet resources for certain user agents upon one or more conditions being satisfied according to an embodiment.

FIGS. 3A and 3B are sequence diagrams that illustrate exemplary operations for controlling access to internet resources for certain user agents upon one or more conditions being satisfied according to an embodiment. The sequence diagrams of FIGS. 3A and 3B are described with respect to the exemplary embodiment of FIG. 1. However, the operations of FIGS. 3A and 3B can be performed by different embodiments from FIG. 1, and the embodiment of FIG. 1 can perform different operations from FIGS. 3A and 3B. Prior to the operations of FIGS. 3A and 3B, resource owners have configured the gated resource service including configuring a gated resource policy that restricts access for certain user agents.

At operation 301, the intermediary server 120 receives a request for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource.

At operation 303, the intermediary server 120 performs a user agent detection and verification process. The user agent detection and verification process may include determining whether the request includes information that allows the intermediary server 120 to verify the identity of the user agent of the request. For instance, the intermediary server 120 determines whether the request includes a signature header that includes a digital signature, and if so, validates the signature to verify the identity of the user agent. As another example, if a session identifier is used for verifying the identity of the user agent, the request handler 122 looks for the session identifier in the request, and if found, looks up stored session state to determine whether the identity of the user agent can be verified. If a verified identity of the user agent cannot be determined, the intermediary server 120 determines a predicted user agent of the request. For example, the user agent determiner 124 determines the predicted user agent of the request, like as previously described. The category of the user agent may also be predicted like as previously described.

The intermediary server 120 determines whether there is a gated resource policy that is applicable for the determined user agent (either predicted or verified) for the requested resource at operation 305. For instance, the intermediary server 120 analyzes the gated resource configuration 146 for the hostname of the request and determines whether a gated resource policy applies for the determined user agent. If a gated resource policy does not apply, the intermediary server 120 continues processing the request without further gated processing. For instance, the intermediary server 120 transmits a request for the resource to the origin server 130 at operation 307, and receives a response from the origin server 130 at operation 309 that includes the requested resource. The intermediary server 120 transmits a response to the user agent 112 that includes the requested resource at operation 311.

If a gated resource policy applies to the determined user agent for the requested resource, the intermediary server 120 determines whether the identity of the user agent is verified, at operation 313. If the identity of the user agent is not verified, then operation 315 is performed. If the identity of the user agent is verified, then operation 327 is performed.

If the identity of the user agent is not verified, the intermediary server 120 transmits a response (a gated resource response) that indicates access to the resource is contingent upon one or more conditions being satisfied. The gated resource response may have a 402 HTTP status code. The gated resource response can include a description of the condition(s) that are required to be satisfied to access the requested resource, a description of the operative boundaries for the access for the requested resource, and include directions to retrieve a file that includes instructions for using the gated resource service.

In an embodiment, the gated resource response is dynamically generated based on the gated resource configuration applicable for the hostname and/or the type or specific user agent making the request. For example, different resource owners can configure different conditions. As another example, a resource owner can configure different conditions for different user agents, or types of user agents, for the same hostname. As another example, the condition(s)

described in the gated resource response can be generated using the condition tiers defined by the resource owner and the freshness of the resource. The intermediary server 120 may determine the freshness of the resource in different ways. For instance, the intermediary server 120 may access the resource and inspect a Last-Modified header which indicates the date and time of the last modification. As another example, the intermediary server 120 may inspect an Entity Tag (ETag) header that provides a version identifier and verify the version identifier with the version identifier in cache. As another example, the intermediary server 120 may detect updates by generating a hash of the resource and comparing the hash with a previously stored hash for the same resource, where a difference indicates an update.

In an embodiment, the gated resource response includes a summary of the resource that is requested. For instance, the intermediary server 120, or other server of the gated resource service, may operate an AI model (e.g., an LLM model) on the resource that summarizes the content. The summary of the content provides more information for the user agent, or the resource consumer, to determine whether it wants to proceed with acquiring the resource and complying with the necessary condition(s). The summary of the resource may also be available on a website provided by the gated resource service that is accessible to the resource consumer. This website can also include other summaries of other resources that the user agent 112 has requested.

At operation 317, the user agent 112 transmits a request that is received by the intermediary server 120 for the gated resource instructions file. At operation 319, the intermediary server 120 transmits the gated resource instructions file to the user agent 112. The gated resource instructions file includes instructions for establishing a relationship with the authorization provider and how to use the service such as instructions to implement digital signatures for interactions with the gated resource service.

The resource consumer establishes a relationship with the authorization provider through the authorization provider server 150 using the user agent operator computing device 105 at operation 321. The relationship allows the authorization provider to provide authorization for accessing resources. The authorization provider server 150 provides an authorization artifact to the user agent operator computing device 105 of the resource consumer at operation 323. The authorization artifact is uniquely associated with the account of the resource consumer. The authorization artifact is used when establishing an authorization integration with the gated resource service. The resource consumer also establishes a relationship with the gated resource service such as an authorization integration with the gated resource service at operation 325. The control server also allows the resource consumer to establish a unique cryptographic identity for their user agent. For instance, the control server may allow the resource consumer to identify a location where the public key(s) are for validating digital signatures included in requests.

Referring to FIG. 3B, if the identity of the user agent is verified, the intermediary server 120 determines whether the one or more conditions of the gated resource policy have been met at operation 327. Determining whether the one or more conditions have been met can include determining whether consent or acceptance of the condition term(s) has been made by or on behalf of the user agent. For instance, the acceptance of the term(s) may be included in a header of the request. Alternatively, the acceptance of the term(s) may be found in the UA operator configuration 148 (e.g., a pre-acceptance of one or more terms).

If the conditions have not been met, then operation 329 is performed where the intermediary server 120 transmits a response (a gated resource response) that indicates access to the resource is contingent upon one or more conditions being satisfied. This response is like the response sent in operation 315. If the conditions have been met, then access to the resource will be allowed by the intermediary server 120. The intermediary server 120 thus retrieves the resource. Retrieving the resource may include retrieving the resource from the origin server 130 (e.g., transmitting the request to the origin server 130 and receiving a response containing the resource from the origin server 130) or retrieving the resource from cache that is available to the intermediary server 120. In the example shown in FIG. 3B, the intermediary server 120 transmits a request for the resource to the origin server 130 at operation 331, and receives a response from the origin server 130 that includes the requested resource at operation 333. The intermediary server 120 transmits a response that includes the requested resource to the user agent 112 at operation 335.

The intermediary server 120 may log the access at operation 337. Logging the access may include logging the time of the access, the user agent making the request, the category of the user agent making the request, the zone of the resource, and the name or path of the resource. The intermediary server 120 may also cause data of the accounts of the resource consumer and the resource owner to be updated (e.g., causing a value exchange from the resource consumer to the resource owner). For instance, the intermediary server 120 can transmit an authorization request to the authorization provider server 150 that includes the authorization artifact, and receive an authorization response that indicates whether authorization was approved.

Embodiments have been described that verify the identity of a user agent as a requirement for accessing a resource protected by the gated resource service. In another embodiment, a token based system is used for controlling access to internet resources for certain user agents upon one or more conditions being satisfied is described. In this embodiment, the resource consumer establishes a relationship with an authorization provider and receives an authorization artifact. The user agent transmits a token generation request to a token generation endpoint that includes this authorization artifact. The token generation endpoint determines whether the condition has been satisfied including transmitting an authorization request to the authorization provider that includes the authorization artifact, and it receives an authorization response that indicates whether authorization was approved. After determining that the condition(s) are satisfied, the token generation endpoint generates a token and transmits it to the user agent. The user agent transmits the request for the internet resource with the token. The intermediary server receives this request and determines whether the token is valid. If the token is valid, the intermediary server allows access to the resource.

Like in other embodiments, the condition(s) can be dynamically generated by the gated resource service. For instance, the gated resource service can dynamically set condition(s) for access based at least in part on how recently the resource was created or updated (sometimes referred herein as the "freshness" of the resource). A resource that is part of an archive may have less stringent condition(s) for access compared to a resource that is newly created, for example. A resource owner can define condition tiers based on the freshness of the resource. An example tier structure could include: resources modified or created in the last 24 hours, those modified or created between 24 hours and a week ago, those modified or created between a week and a month ago, and those that are created or modified older than a month. This tier structure is an example and different tier structures can be defined.

Figure 4:
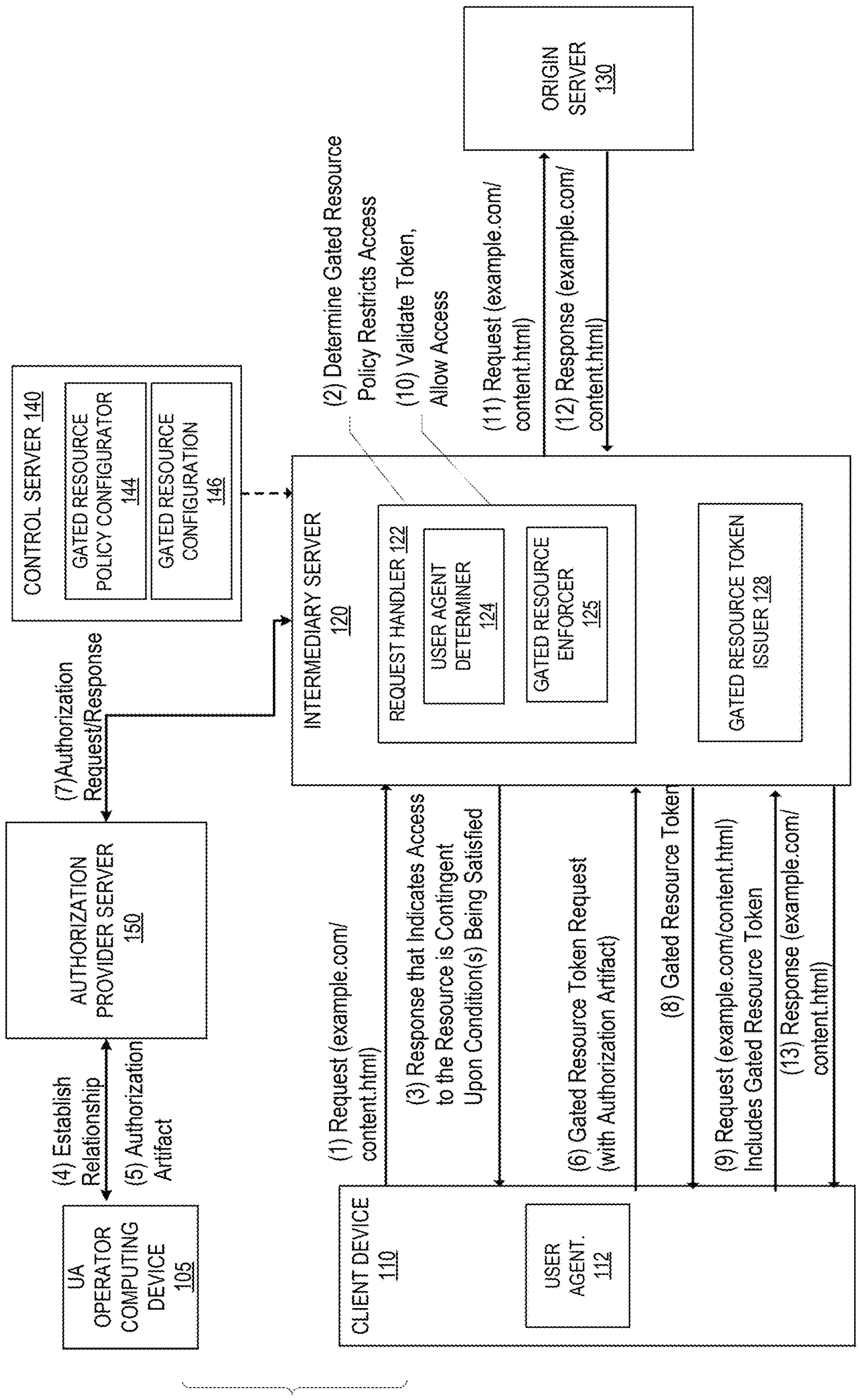
FIG. 4 illustrates an exemplary system for controlling access to internet resources for certain user agents based on one or more conditions being satisfied, according to an embodiment.

FIG. 4 illustrates an exemplary system for controlling access to internet resources for certain user agents based on one or more conditions being satisfied, according to an embodiment. The authorization provider server 150, which may be operated by a third-party authorization provider, provides authorization for access to resources of the resource owner. In an embodiment, the owner or operator of the user agent 112, the owner or operator of the intermediary server 120, and the owner or operator of the origin server 130 each have a relationship with the authorization provider. In an embodiment, a condition for accessing a resource depends at least in part on receiving authorization from the authorization provider. In addition, one or more other conditions may need to be satisfied prior to allowing access, like as previously described.

FIG. 4 shows an example of the operations of the system. Prior to these operations, the owner or operator of the hostname that is hosted by the origin server 130 (the resource owner) has configured the gated resource service including configuring a gated resource policy. At operation 1, the user agent 112 transmits a request (e.g., an HTTP or HTTPS request) that is received by the intermediary server 120 and processed by the request handler 122. The request is for a resource hosted by the origin server 130. In the example of FIG. 4, the request is a GET request for the resource at the URL example.com/content.html.

The request handler 122 determines, at operation 2, that a gated resource policy that restricts access to the requested resource is applicable to the request. As described earlier, the gated resource policy may only be applicable to certain user agents as configured by the resource owner. For instance, the gated resource policy may be applicable only to user agents that are bots associated with artificial intelligence (AI) such as AI crawler bots and AI search bots. If the gated resource policy is applicable to one or more user agent(s) and not other(s), the request handler 122 determines the user agent of the request. After determining the user agent of the request, the request handler 122 determines whether there is a gated resource policy that is applicable to the determined user agent. If there is such a gated resource policy, the request handler 122 determines whether the request satisfies the gated resource policy (e.g., meets all the condition(s) configured for the policy) and if not blocks the request with information that notifies the user agent 112 that compliance with the condition(s) must occur to gain access to the resource.

The user agent determiner 124 of the request handler 122 determines the predicted identity of the user agent of the request, like as previously described. In this embodiment, the user agent determiner 124 may not verify the identity of the user agent.

The gated resource enforcer 125 of the request handler 122 determines whether the request satisfies the gated resource policy (e.g., meets all the condition(s) configured for the policy). In an embodiment, the presence of a valid gated resource token in the request determines that the request satisfies the gated resource policy. The gated resource token can be included in a custom header of the request. The gated resource token may be in the form of a JSON Web Token (JWT). The gated resource token includes information that allows the gated resource enforcer 125 to determine whether the condition(s) precedent for accessing the requested resource has been satisfied. The gated resource token may include the hostname for which the token is valid, a token issuance timestamp, a token expiration timestamp, a user agent identifier, a number of times the token can be used, and a unique token identifier. The gated resource token may be signed.

In the example of FIG. 4, the request in operation 1 does not satisfy the gated resource policy. For example, it does not include a valid gated resource token in the request. The gated resource enforcer 125 blocks access to the resource and transmits a response to the user agent 112 in operation 3 that indicates access to the resource is contingent upon condition(s) being satisfied. This response is sometimes referred to herein as a gated resource response. The gated resource response may have a 402 HTTP status code. In this embodiment, the gated resource response can include a description of the condition(s) that are required to be satisfied to access the requested resource, a description of the operative boundaries for the access for the requested resource, and include directions to retrieve a file that includes instructions for using the gated resource service. Although not shown in FIG. 4, the user agent 112 may download the file that includes instructions for using the gated resource service, including establishing a relationship with the authorization provider and/or a token generation endpoint with instructions for submitting a gated token request.

In an embodiment, the gated resource response is dynamically generated by the intermediary server 120 based on the resource that is being requested. For example, the condition (s) described in the gated resource response can be generated using the condition tiers defined by the resource owner and the freshness of the resource. The intermediary server 120 may determine the freshness of the resource in different ways. For instance, the intermediary server 120 may access the resource and inspect a Last-Modified header which indicates the date and time of the last modification. As another example, the intermediary server 120 may inspect an Entity Tag (ETag) header that provides a version identifier and verify the version identifier with the version identifier in cache. As another example, the intermediary server 120 may detect updates by generating a hash of the resource and comparing the hash with a previously stored hash for the same resource, where a difference indicates an update.

In an embodiment, the gated resource response includes a summary of the resource that is requested. The summary may be generated using an AI model (e.g., an LLM model) that operates on the resource and summarizes its content. The summary of the content provides more information for the user agent, or the resource consumer, to determine whether it wants to proceed with acquiring the resource and complying with the necessary condition(s). The summary of the resource may also be available on a website provided by the gated resource service that is accessible to the resource consumer. This website can also include other summaries of other resources that the user agent 112 has requested.

In the example of FIG. 4, at operation 4, the owner or operator of the user agent 112 (the resource consumer), establishes a relationship with the authorization provider through the authorization provider server 150 using the user agent operator computing device 105. The relationship allows the authorization provider to provide authorization for accessing resources. The authorization provider server 150 provides an authorization artifact to the user agent operator computing device 105 of the resource consumer at operation 5. The authorization artifact is uniquely associated with the account of the resource consumer. The authorization artifact is used by the intermediary server 120 when determining whether to issue a gated resource token. The authorization artifact provided by the authorization provider server 150 for the resource consumer can be used by the intermediary server 120 for multiple resource owners (e.g., all resource owners that are using the gated resource service). Thus, instead of needing to establish a relationship with each resource owner, the resource consumer can establish a single relationship with the authorization provider that applies to multiple resource owners.

The authorization artifact is used by the intermediary server 120 when determining whether to issue a gated resource token to the user agents of the resource consumer such as the user agent 112. For instance, the user agent 112 is configured by the resource owner to transmit a request for a gated token to the gated resource token issuer 128 at operation 6. This request includes the authorization artifact generated by the authorization provider server 150. The gated resource token issuer 128 uses the authorization artifact when determining whether condition(s) for access has been met. In an embodiment, the authorization artifact is a unique identifier that is generated by the authorization provider server 150 that is used by the gated resource token issuer 128 to issue an authorization request to the authorization provider server 150. In such an embodiment, the authorization provider server 150 returns a response indicating whether authorization was approved. In the example of FIG. 4, the gated content token issuer 128 transmits an authorization request to the authorization provider server 150 including the authorization artifact and receives an authorization response from the authorization provider server 150. In the example in FIG. 4, the authorization was approved for the authorization artifact. The gated content token issuer 128 may enforce condition(s) that are in addition to, or in lieu of, the remote authorization condition. For example, if the gated resource policy includes an agreement regarding how the resource is allowed to be used, the gated content token issuer 128 determines whether the agreement has been agreed to by the resource consumer. The acceptance of the term(s) may be found in the request for the gated token. For instance, the request may include a header that indicates an acceptance of the one or more terms. Alternatively, the acceptance of the term(s) may be found in configuration UA operator configuration (e.g., pre-acceptance of certain term(s)).

After determining that the condition(s) of the gated resource policy are satisfied, the gated resource token issuer 128 generates a gated resource token and transmits the token to the user agent 112 at operation 8. The gated resource token may be in the form of a JSON Web Token (JWT). The gated resource token may include one or more of the following: the hostname for which the token is valid, a token issuance timestamp, a token expiration timestamp, a user agent identifier, a number of times the token can be used, and a unique token identifier. The gated resource token may be signed. Although the gated resource token issuer 128 is shown as being part of the same intermediary server 120 as the request handler 122, the gated resource token issuer 128 may be on a separate physical server from the request handler 122.

After or as part of issuing the gated resource token, the gated resource token issuer 128 may cause the account(s) of the resource consumer and/or the resource provider to be updated at the authorization provider. For example, the gated resource token issuer 128 may cause funds to be transferred from the account of the resource consumer to the account of the resource owner, the amount of funds being specified in the gated resource policy. In another example, the gated resource token issuer 128 may cause funds to be transferred from the account of the resource consumer to the account of the provider of the gated token service, which may then be transferred to the account of the resource owner. The gated resource token issuer 128 may log the generation of the gated resource token. This may include logging the time the token was generated, a unique transaction identifier, and an amount of any funds being transferred.

After receiving the gated resource token, the user agent 112 can resubmit the request with the token to gain access to the requested resource. Thus, at operation 9, the user agent 112 transmits the request for the resource including the gated resource token. For example, the request is a GET request for the resource at the URL example.com/content.html. The gated resource token may be included in a custom header of the request. The request handler 122 receives the request that includes the gated resource token and the gated resource enforcer 125 determines whether the gated resource token is valid. Determining whether the gated resource token is valid may include performing one or more of the following: determining whether the hostname in the token matches the hostname of the request; determining that the operative boundaries constraints of the token have not been violated, and determining that the signature of the gated resource token is valid.

The gated resource token may have operative boundaries that can be time-based, usage-based, or a combination of time-based and usage-based, as configured by the resource owner. For example, the gated resource token may allow for a single access, multiple accesses, multiple accesses within a time period, or any number of accesses within a time period. In a single access form, the gated resource token is valid only for a single retrieval of the resource. In multiple accesses form, the gated resource token is valid for N number of accesses of the resource, or a particular hostname or zone, where Nis more than one. In multiple accesses within a time period form, the gated resource token is valid for N number of accesses of the resource, or a particular hostname or zone, for a time period. In an any access within a period form, the gated resource token is valid for any number of accesses of the resource, or a particular hostname or zone, for a time period. If the token is time-based, the gated resource enforcer 125 determines whether the token has expired. If the token is usage-based, the gated resource enforcer 125 determines whether the token has been used more than the N number of accesses that are allowed. If the token is a combination of time-based and usage-based, the gated resource enforcer 125 determines whether the token has been used more than the N number of accesses allowed or whether the token has expired.

If the gated resource token is valid, access is allowed. As shown in FIG. 4, at operation 10, the gated resource enforcer 125 validates the gated resource token received in the request of operation 9 and allows access to the resource. The request handler 122 retrieves the resource. Retrieving the resource may include retrieving the resource from the origin server 130 (e.g., transmitting the request to the origin server 130 and receiving a response containing the resource from the origin server 130) or retrieving the resource from cache that is available to the request handler 122. As shown in the example of FIG. 4, the request handler 122 transmits a request for the resource to the origin server 130 at operation 11, and receives a response with the resource from the origin server 130 at operation 12. The request handler 122 transmits the response with the resource to the user agent 112 at operation 13.

In an embodiment, the request handler 122 transmits a modified resource to the user agent 112 instead of the original resource. For instance, the request handler 122 may modify the retrieved resource to make a machine-readable form that is designed specifically for the type of the user agent 112, such as a markdown file, a JSON file, an XML file, or other structured file that is designed for easier consumption by the user agent. For instance, if the requested resource is a web page (e.g., an HTML document), the request handler 122 can modify the web page to remove elements such as cascading style sheets (CSS), scripts (e.g., JavaScripts), layouts (e.g., <div> structures, tables, etc.), form elements (e.g., input fields, buttons, dropdowns), media (e.g., images, video, iframes, flash objects), navigation menus, advertisements and pop-ups, comments in the HTML, meta tags and content within the <head> of the HTML. This simplifies the HTML document into a more text-focused format, which can be easier processed by user agents, such as user agents that are used to feed AI models.

The request handler 122 may log the access. Logging the access may include logging the time of the access, the user agent making the request, the category of the user agent making the request, the zone of the resource, and the name or path of the resource. The request handler 122 may update the gated resource token. For example, if the gated resource token is usage-based, the request handler 122 may cause data to be updated to reflect the current use (e.g., decrease the number of available uses remaining for the token).

In the example shown in FIG. 4, the resource consumer establishes a relationship with the authorization provider directly. In an embodiment, the resource consumer establishes a relationship with the authorization provider through the gated resource service. For instance, an API provided through the gated resource service (e.g., on the intermediary server 120 or other service of the gated resource service) allows the resource consumer to establish a relationship with the authorization provider indirectly. In such an embodiment, a server of the gated resource service receives the authorization artifact for the resource consumer and transmits it to the resource consumer.

Figure 5:
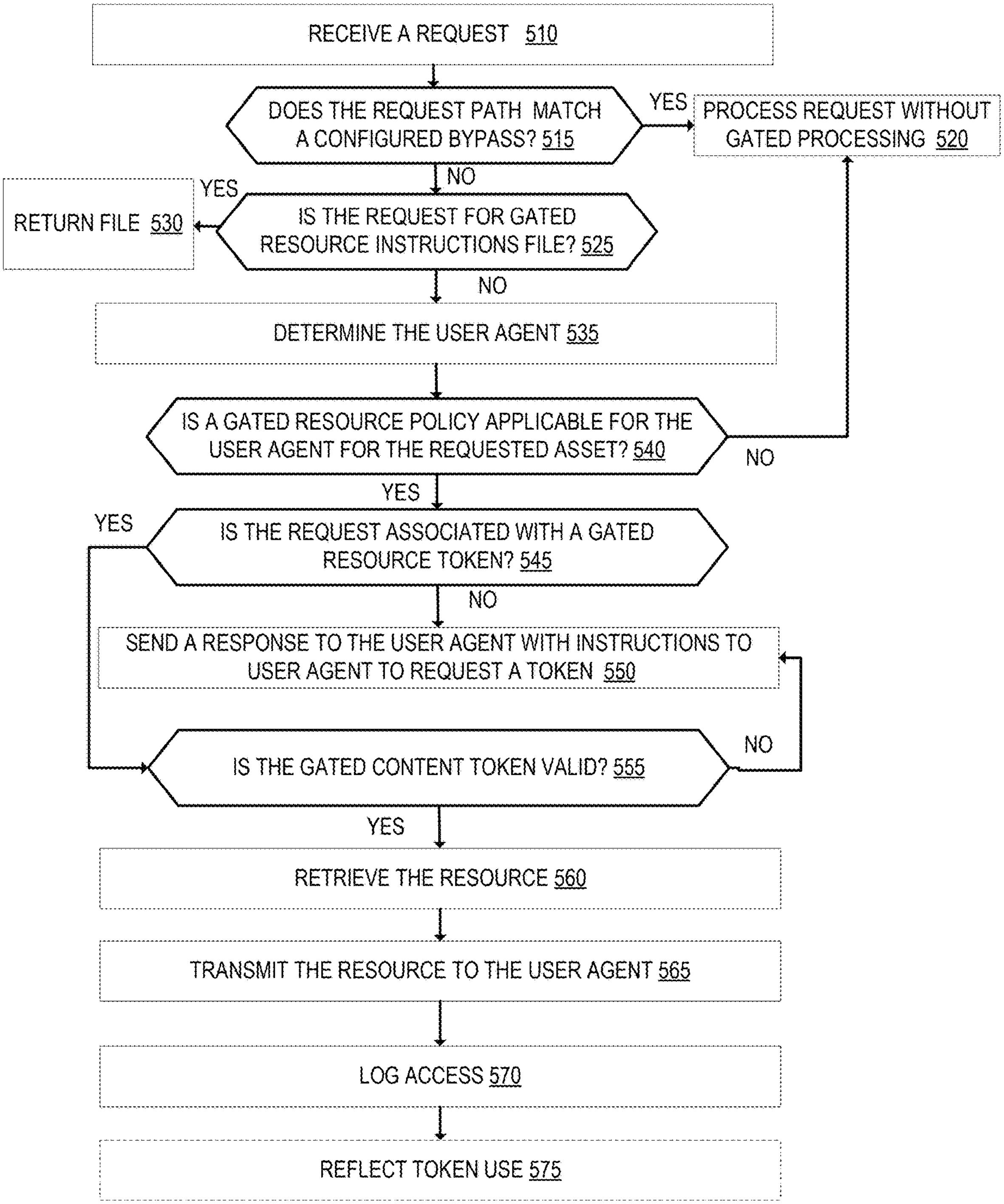
FIG. 5 is a flow diagram that illustrates exemplary operations performed for controlling access to internet resources for certain user agents based on one or more conditions being satisfied according to an embodiment.

FIG. 5 is a flow diagram that illustrates exemplary operations performed for controlling access to internet resources for certain user agents based on one or more conditions being satisfied according to an embodiment. The operations of FIG. 5 are described with respect to the exemplary embodiment of FIG. 4. However, the operations of FIG. 5 can be performed by different embodiments than FIG. 4, and the embodiment of FIG. 4 can perform different operations from FIG. 5. Prior to the operations of FIG. 5, the resource owner has configured the gated resource service including configuring a gated resource policy that restricts access for certain user agents.

At operation 510, the request handler 122 of the intermediary server 120 receives a request from the user agent 112 of the client device 110. The request is for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource. The request handler 122 determines the hostname of the requested resource. There may be a policy that defines a configured bypass path where the gated processing is not performed. If, at operation 515, the request path matches a configured bypass, then the request is processed without the gated processing described further in FIG. 5. If the request path does not match a configured bypass, then operation 525 is performed.

At operation 525, the request handler 122 determines whether the request is for a file that provides instructions to the user agent 112 on how to request a gated resource token and/or use the gated resource token service. This file is sometimes referred to herein as the gated resource instructions file. The gated resource instructions file may be a text file, a JSON file, an XML file, or other structured file format. The gated resource instructions file includes instructions that indicate that a relationship needs to be created between the resource consumer and the authorization provider. The gated resource instructions file may include a link to create the relationship that is dynamically generated by the request handler 122. The gated resource instructions file may include a link to the token issuer to request a gated resource token be issued. The gated resource instructions file is machine readable such that the user agent 112 may act on this file without human intervention if a relationship has already been created between the resource consumer and the authorization provider. In an embodiment, the gated resource instructions file specifies the condition(s) that must be met to gain access to the requested file. If the request is for the gated resource instructions file, then the request handler 122 returns the file to the user agent 112 at operation 530. If the request is not for the gated resource instructions file, then operation 535 is performed.

In an embodiment, the gated resource processing is applicable only to certain one or more user agents. For example, the gated resource processing may be applicable only to user agents that are associated with artificial intelligence (AI) bots such as AI crawler bots and AI search bots. The type of user agents and/or the specific user agents in which the gated resource processing applies may be configured by the resource owner. In the example of FIG. 5, the gated resource policy is applied to certain user agent(s) and not other(s).

At operation 535, the user agent determiner 124 of the request handler 122 determines the predicted identity of the user agent of the request like as previously described. The user agent determiner 124 may also determine the category of the user agent. For example, the user agent determiner 124 can compare the determined user agent against a predefined list of user agents that are organized into categories. Example categories include web browsers, mobile browsers, email clients, media players, IoT devices, libraries and frameworks, search engine crawlers, advertising bots, search engine optimization bots, aggregator bots, AI crawler bots, AI search bots, monitoring bots, security bots, webhooks bots, and unknown. If the determined user agent matches an entry within a specific category, the user agent determiner 124 applies that category to the user agent. If no match is found, the user agent determiner 124 applies an unknown category to the user agent.

After determining the user agent, the request handler 122 determines whether there is a gated resource policy that is applicable for the user agent for the requested resource at operation 540. For instance, the request handler 122 analyzes the gated resource configuration 146 for the hostname of the request and determines whether a gated resource policy applies for the determined user agent. If a gated resource policy does not apply, then the request handler 122 continues processing the request without further gated processing at operation 520. If a gated resource policy applies, then operation 545 is performed.

At operation 545, the request handler 122 determines whether the request is associated with a gated resource token. In an embodiment, such a gated resource token is included in a header of the request (e.g., a custom header such as X-CF-Gated-Resource-Token). In such an embodiment, the request handler 122 inspects the headers of the request for the specified custom header and if found, extracts the token from the header. If the request is not associated with a gated resource token, then operation 550 is performed. If the request is associated with a gated resource token, then operation 555 is performed.

The gated resource token may be in the form of a JSON Web Token (JWT). The gated resource token includes information that allows the request handler 122 to determine whether the condition(s) precedent for accessing the requested resource have been satisfied. The gated resource token may include the hostname for which the token is valid, a token issuance timestamp, a token expiration timestamp, a user agent identifier, a number of times the token can be used, and/or a unique token identifier. The gated resource token may be signed.

The gated resource token has operative boundaries that may be time-based, usage-based, or a combination of time-based and usage-based. For example, the gated resource token may allow for a single access, multiple accesses, multiple accesses within a time period, or any number of accesses within a time period. In a single access form, the gated resource token is valid only for a single retrieval of the resource. In multiple accesses form, the gated resource token is valid for N number of accesses of the resource, or a particular hostname or zone, where Nis more than one. In multiple accesses within a time period form, the gated resource token is valid for N number of accesses of the resource, or a particular hostname or zone, for a time period. In an any access within a period form, the gated resource token is valid for any number of accesses of the resource, or a particular hostname or zone, for a time period.

At operation 555, the request handler 122 determines whether the gated resource token is valid may include performing one or more of the following: determining whether the hostname in the token matches the hostname of the request; determining that the operative boundaries constraints of the token have not been violated, and determining that the signature of the gated resource token is valid. For instance, if the token is time-based, the request handler 122 determines whether the token has expired. If the token is usage-based, the request handler 122 determines whether the token has been used more than the N number of accesses that are allowed. If the token is a combination of time-based and usage-based, the request handler 122 determines whether the token has been used more than the N number of accesses allowed or whether the token has expired. If the gated resource token is valid, then operation 560 is performed. If the gated resource token is not valid, then operation 550 is performed.

If the gated resource is valid, then access to the resource is allowed. Thus, at operation 560, the request handler 122 retrieves the resource. Retrieving the resource may include retrieving the resource from the origin server 130 (e.g., transmitting the request to the origin server 130 and receiving a response containing the resource from the origin server 130) or retrieving the resource from cache that is available to the request handler 122. The request handler 122 transmits the retrieved resource to the user agent 112 at operation 565.

In an embodiment, the request handler 122 transmits a modified resource to the user agent 112 instead of the original resource. For instance, the request handler 122 may modify the retrieved resource to make a machine-readable form that is designed specifically for the type of the user agent 112, such as a markdown file, a JSON file, an XML file, or other structured file that is designed for easier consumption by the user agent. For instance, if the requested resource is a web page (e.g., an HTML document), the request handler 122 can modify the web page to a markdown file. to remove elements such as cascading style sheets (CSS), scripts (e.g., JavaScripts), layouts (e.g., <div> structures, tables, etc.), form elements (e.g., input fields, buttons, dropdowns), media (e.g., images, video, iframes, flash objects), navigation menus, advertisements and pop-ups, comments in the HTML, meta tags and content within the <head> of the HTML. This simplifies the HTML document into a more text-focused format, which can be easier processed by user agents, such as user agents that are used to feed AI models.

The request handler 122 may log the access at operation 570. Logging the access may include logging the time of the access, the user agent making the request, the category of the user agent making the request, the zone of the resource, and the name or path of the resource. The request handler 122 may reflect the gated token usage at operation 575. For example, if the gated resource token is usage-based, the request handler 122 may cause data to be updated to reflect the current use (e.g., decrease the number of available uses remaining for the token).

At operation 550 (the request is not associated with a valid gated resource token), the request handler 122 causes a response to be transmitted to the user agent 112 that indicates that access to the resource is contingent upon one or more conditions being satisfied (the gated resource response). The gated resource response may have a 402 HTTP status code. The gated resource response can include a description of the condition(s) that are required to be satisfied to access the requested resource, a description of the operative bounds for the access for the requested resource, and include directions to retrieve the gated resource instructions file. In an embodiment, the gated resource response is dynamically generated based on the gated resource configuration applicable for the hostname and/or the type or specific user agent making the request. For example, different resource owners can configure different conditions. As another example, a resource owner can configure different conditions for different user agents, or types of user agents, for the same hostname. As another example, the condition(s) described in the gated resource response can be generated using the condition tiers defined by the resource owner and the freshness of the resource. The intermediary server 120 may determine the freshness of the resource in different ways. For instance, the intermediary server 120 may access the resource and inspect a Last-Modified header which indicates the date and time of the last modification. As another example, the intermediary server 120 may inspect an Entity Tag (ETag) header that provides a version identifier and verify the version identifier with the version identifier in cache. As another example, the intermediary server 120 may detect updates by generating a hash of the resource and comparing the hash with a previously stored hash for the same resource, where a difference indicates an update.

Figure 6:
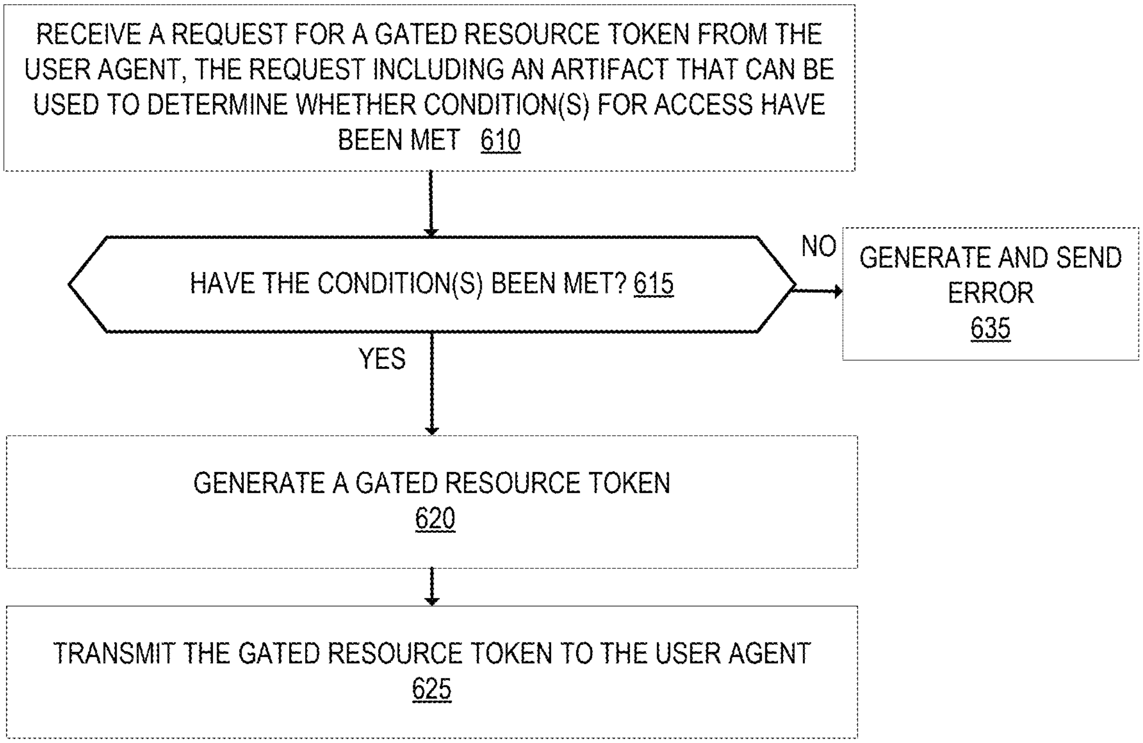
FIG. 6 is a flow diagram that illustrates exemplary operations performed for generating a token used for controlling access to internet resources for certain user agents based on one or more conditions being satisfied according to an embodiment.

FIG. 6 is a flow diagram that illustrates exemplary operations performed for generating a token used for controlling access to internet resources for certain user agents based on one or more conditions being satisfied according to an embodiment. The operations of FIG. 6 are described with respect to the exemplary embodiment of FIG. 4. However, the operations of FIG. 6 can be performed by different embodiments than FIG. 4, and the embodiment of FIG. 4 can perform different operations from FIG. 6. Prior to the operations of FIG. 6, the resource owner has configured the gated resource service including configuring a gated resource policy that restricts access for certain user agents.

At operation 610, the gated resource token issuer 128 receives a request for a gated token from the user agent 112. This token request includes an authorization artifact that can be used to determine whether at least one condition (e.g., a remote authorization condition) for accessing a resource has been met. The acceptance of any condition term(s) may also be found in the request for the gated token. For instance, the request may include a header that indicates an acceptance of the one or more terms. Alternatively, the acceptance of the term(s) may be found in configuration UA operator configuration (e.g., pre-acceptance of certain term(s)).

Next, at operation 615, the gated resource token issuer 128 determines whether the condition(s) in the gated resource policy have been met. For instance, the gated resource token issuer 128 transmits an authorization request to the authorization provider server 150 that includes the authorization artifact included in the request of operation 610. The gated resource token issuer 128 will receive a response from the authorization provider server 150 that indicates whether authorization is approved. If the authorization is not approved, then operation 635 is performed where the gated resource token issuer 128 generates and sends an error message to the user agent 112. If the authorization is approved, and any other condition(s) have been met, then operation 620 is performed. The gated content token issuer 128 may enforce condition(s) that are in addition to, or in lieu of, the remote authorization condition. For example, if the gated resource policy includes an agreement regarding how the resource is allowed to be used, the gated content token issuer 128 determines whether the agreement has been agreed to by the resource consumer.

At operation 620, the gated resource token issuer 128 generates a gated resource token. The gated resource token may be in the form of a JWT. The gated resource token may include one or more of the following: the hostname for which the token is valid, a token issuance timestamp, a token expiration timestamp, a user agent identifier, a number of times the token can be used, and a unique token identifier. The gated resource token may be signed. The gated resource token issuer 128 transmits the generated gated resource token to the user agent at operation 625.

After or as part of issuing the gated resource token, the gated resource token issuer 128 may cause the account(s) of the resource consumer and/or the resource provider to be updated at the authorization provider. For example, the gated resource token issuer 128 may cause funds to be transferred from the account of the resource consumer to the account of the resource owner, the amount of funds being specified in the gated resource policy. In another example, the gated resource token issuer 128 may cause funds to be transferred from the account of the resource consumer to the account of the provider of the gated token service. The gated resource token issuer 128 may log the generation of the gated resource token. This may include logging the time the token was generated, a unique transaction identifier, and an amount of any funds being transferred.

FIGS. 7A-7D are sequence diagrams that illustrate exemplary operations for controlling access to internet resources for certain user agents upon one or more conditions being satisfied according to an embodiment. The sequence diagrams of FIGS. 7A-7D are described with respect to the exemplary embodiment of FIG. 4. However, the operations of FIGS. 7A-7D can be performed by different embodiments than FIG. 4, and the embodiment of FIG. 4 can perform different operations from FIGS. 7A-7D. Prior to the operations of FIGS. 7A-7D, resource owners have configured the gated resource service including configuring a gated resource policy that restricts access for certain user agents.

At operation 701, the intermediary server 120 receives a request for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource. At operation 703, the intermediary server 120 determines the identity of a predicted user agent of the request, like as previously described. The intermediary server 120 may also determine the category of the user agent like as previously described.

The intermediary server 120 determines whether there is a gated resource policy that is applicable for the user agent for the requested resource. For instance, the intermediary server 120 analyzes the gated resource configuration 146 for the hostname of the request and determines whether a gated resource policy applies for the determined user agent. If a gated resource policy does not apply, the intermediary server 120 continues processing the request without further gated processing. For instance, the intermediary server 120 transmits a request for the resource to the origin server 130 at operation 705, and receives a response from the origin server 130 at operation 707 that includes the requested resource. The intermediary server 120 transmits a response to the user agent 112 that includes the requested resource at operation 709.

If a gated resource policy applies to the user agent for the requested resource, the intermediary server 120 determines if the request is associated with a valid gated resource token at operation 711. Such a gated resource token may be included in a header of the request (e.g., a custom header such as X-CF-Gated-Resource-Token). In such an embodiment, the intermediary server 120 inspects the headers of the request for the specified custom header and if found, extracts the token from the header. If a gated resource token is found, the intermediary server determines whether it is valid. Determining whether the gated resource token is valid can include performing one or more of the following: determining whether the hostname in the token matches the hostname of the request; determining that the operative boundaries constraints of the token have not been violated, and determining that the signature of the gated resource token is valid.

If the request is not associated with a valid token, then at operation 713, the intermediary server 120 transmits a response to the user agent 112 that indicates that access to the resource is contingent upon one or more conditions being satisfied (the gated resource response). The gated resource response may have a 402 HTTP status code. The gated resource response can include a description of the condition(s) that are required to be satisfied to access the requested resource, a description of the operative boundaries for the access for the requested resource, and include directions to retrieve the gated resource instructions file. In an embodiment, the gated resource response is dynamically generated based on the gated resource configuration applicable for the hostname and/or the type or specific user agent making the request. For example, different resource owners can configure different conditions. As another example, a resource owner can configure different conditions for different user agents, or types of user agents, for the same hostname. As another example, the condition(s) described in the gated resource response can be generated using the condition tiers defined by the resource owner and the freshness of the resource. The intermediary server 120 may determine the freshness of the resource in different ways. For instance, the intermediary server 120 may access the resource and inspect a Last-Modified header which indicates the date and time of the last modification. As another example, the intermediary server 120 may inspect an Entity Tag (ETag) header that provides a version identifier and verify the version identifier with the version identifier in cache. As another example, the intermediary server 120 may detect updates by generating a hash of the resource and comparing the hash with a previously stored hash for the same resource, where a difference indicates an update.

At operation 715, the user agent 112 transmits a request that is received by the intermediary server 120 for the gated resource instructions file. At operation 717, the intermediary server 120 transmits the gated resource instructions file to the user agent 112. The gated resource instructions file includes instructions for establishing a relationship with a third-party authorization provider and how to use the service such as how to request a gated resource token. The gated resource instructions file may include a link to the token issuer.

The resource consumer establishes a relationship with the authorization provider through the authorization provider server 150 using the user agent operator computing device 105 at operation 719. The relationship allows the authorization provider to provide authorization for accessing resources. The authorization provider server 150 provides an authorization artifact to the user agent operator computing device 105 of the resource consumer at operation 721. The authorization artifact is uniquely associated with the account of the resource consumer. The authorization artifact is used by the intermediary server 120 when determining whether to issue a gated resource token. The authorization artifact provided by the authorization provider server 150 for the resource consumer can be used by the intermediary server 120 for multiple resource owners (e.g., all resource owners that are using the gated resource service). Thus, instead of needing to establish a relationship with each resource owner, the resource consumer can establish a single relationship with the authorization provider that applies to multiple resource owners.

The user agent 112 is configured by the resource owner to transmit a request for a gated token to the gated resource token issuer 128 at operation 723. This request includes the authorization artifact generated by the authorization provider server 150. The acceptance of any condition term(s) may be found in the request for the gated token. For instance, the request may include a header that indicates an acceptance of the one or more terms. Alternatively, the acceptance of the term(s) may be found in configuration UA operator configuration (e.g., pre-acceptance of certain term (s)).

The gated resource token issuer 128 uses the authorization artifact when determining whether condition(s) for access has been met. The gated content token issuer 128 transmits an authorization request to the authorization provider server 150 including the authorization artifact at operation 725. The authorization provider server 150 determines whether authorization is approved. At operation 727, the gated resource token issuer 128 receives an authorization response from the authorization provider server 150. In the example in FIG. 7A, the authorization was approved. The gated content token issuer 128 may enforce condition(s) that are in addition to, or in lieu of, the remote authorization condition. For example, if the gated resource policy includes an agreement regarding how the resource is allowed to be used, the gated content token issuer 128 determines whether the agreement has been agreed to by the resource consumer.

Assuming all condition(s) have been satisfied, the gated resource token issuer 128 generates a gated content token at operation 729. The gated resource token may be in the form of a JSON Web Token (JWT). The gated resource token may include one or more of the following: the hostname for which the token is valid, a token issuance timestamp, a token expiration timestamp, a user agent identifier, a number of times the token can be used, and a unique token identifier. The gated resource token may be signed. The gated resource token issuer 128 transmits the token to the user agent 112 at operation 731. As part of issuing the gated resource token, the gated resource token issuer 128 may cause the account(s) of the resource consumer and/or the resource provider to be updated at the authorization provider. For example, the gated resource token issuer 128 may cause funds to be transferred from the account of the resource consumer to the account of the resource owner, the amount of funds being specified in the gated resource policy. In another example, the gated resource token issuer 128 may cause funds to be transferred from the account of the resource consumer to the account of the provider of the gated token service. The gated resource token issuer 128 may log the generation of the gated resource token. This may include logging the time the token was generated, a unique transaction identifier, and an amount of any funds being transferred.

Figure 7A:
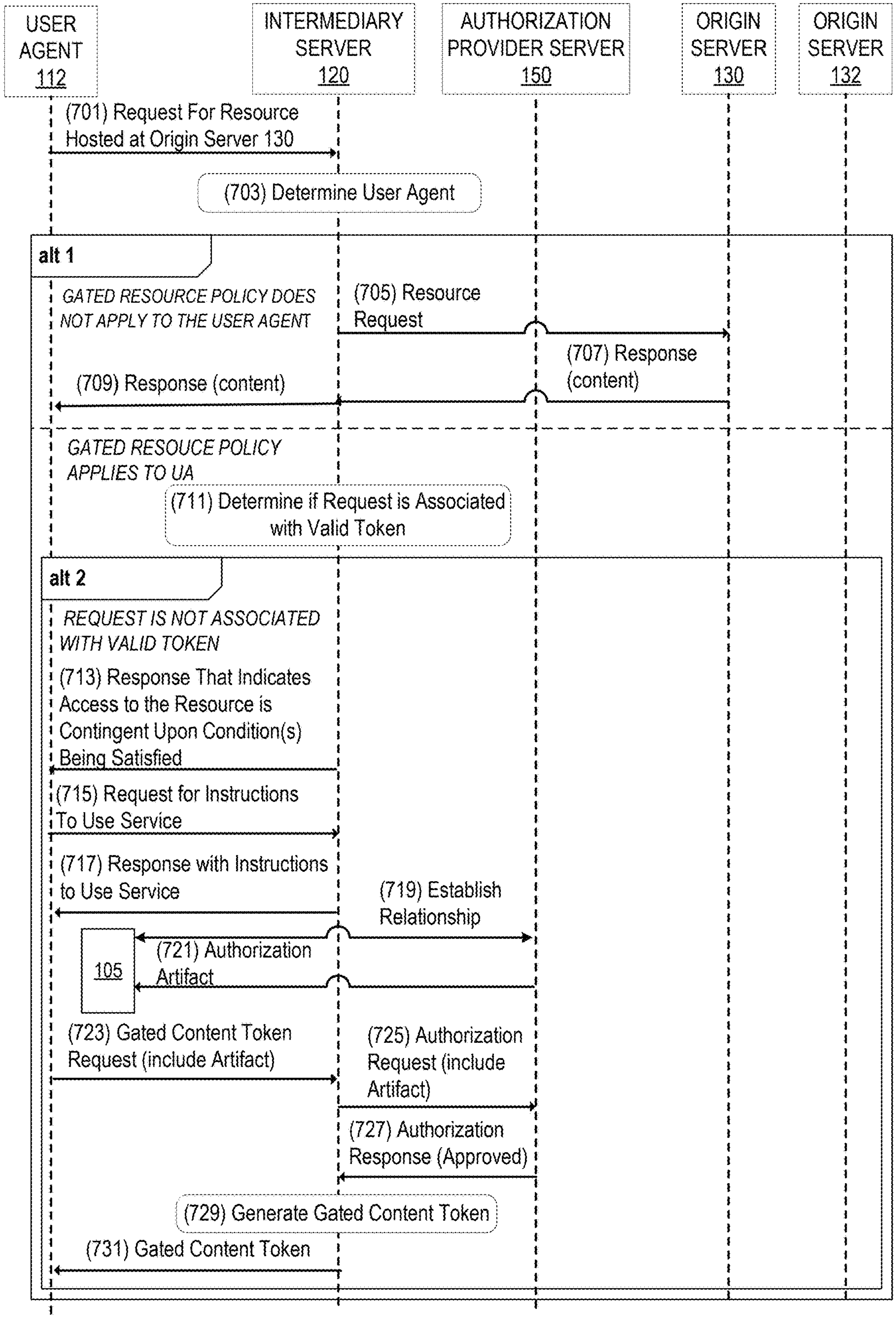
FIG. 7A is a first sequence diagram that illustrates exemplary operations for controlling access to internet resources for certain user agents upon one or more conditions being satisfied according to an embodiment.
Figure 7B:
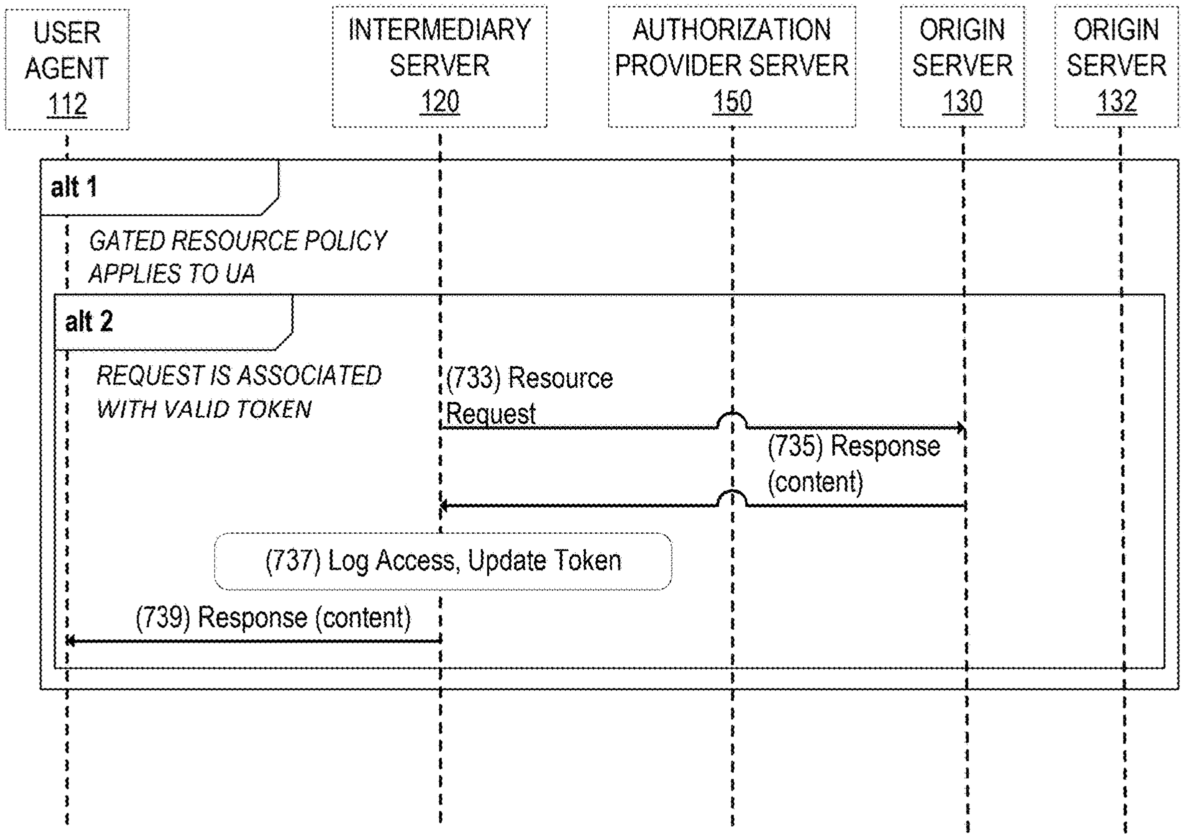
FIG. 7B is a second sequence diagram that illustrates exemplary operations for controlling access to internet resources for certain user agents upon one or more conditions being satisfied according to an embodiment.

The user agent 112 can then transmit the request again with the gated resource token to access the resource. Referring to FIG. 7B, if the request in operation 701 is associated with a valid token, the intermediary server 120 retrieves the resource. Retrieving the resource may include retrieving the resource from the origin server 130 (e.g., transmitting the request to the origin server 130 and receiving a response containing the resource from the origin server 130) or retrieving the resource from cache that is available to the intermediary server 120. In the example shown in FIG. 7B, the intermediary server 120 transmits a request for the resource to the origin server 130 at operation 733, and receives a response from the origin server 130 that includes the requested resource at operation 735. The intermediary server 120 may log the access at operation 737. Logging the access may include logging the time of the access, the user agent making the request, the category of the user agent making the request, the zone of the resource, and the name or path of the resource. The intermediary server 120 may reflect the gated token usage at operation 737. For example, if the gated resource token is usage-based, the intermediary server 120 may cause data to be updated to reflect the current use (e.g., decrease the number of available uses remaining for the token). At operation 739, the intermediary server 120 transmits the retrieved resource to the user agent 112. In an embodiment, the intermediary server 120 transmits a modified resource to the user agent 112 instead of the original resource, as previously described.

Figure 7C:
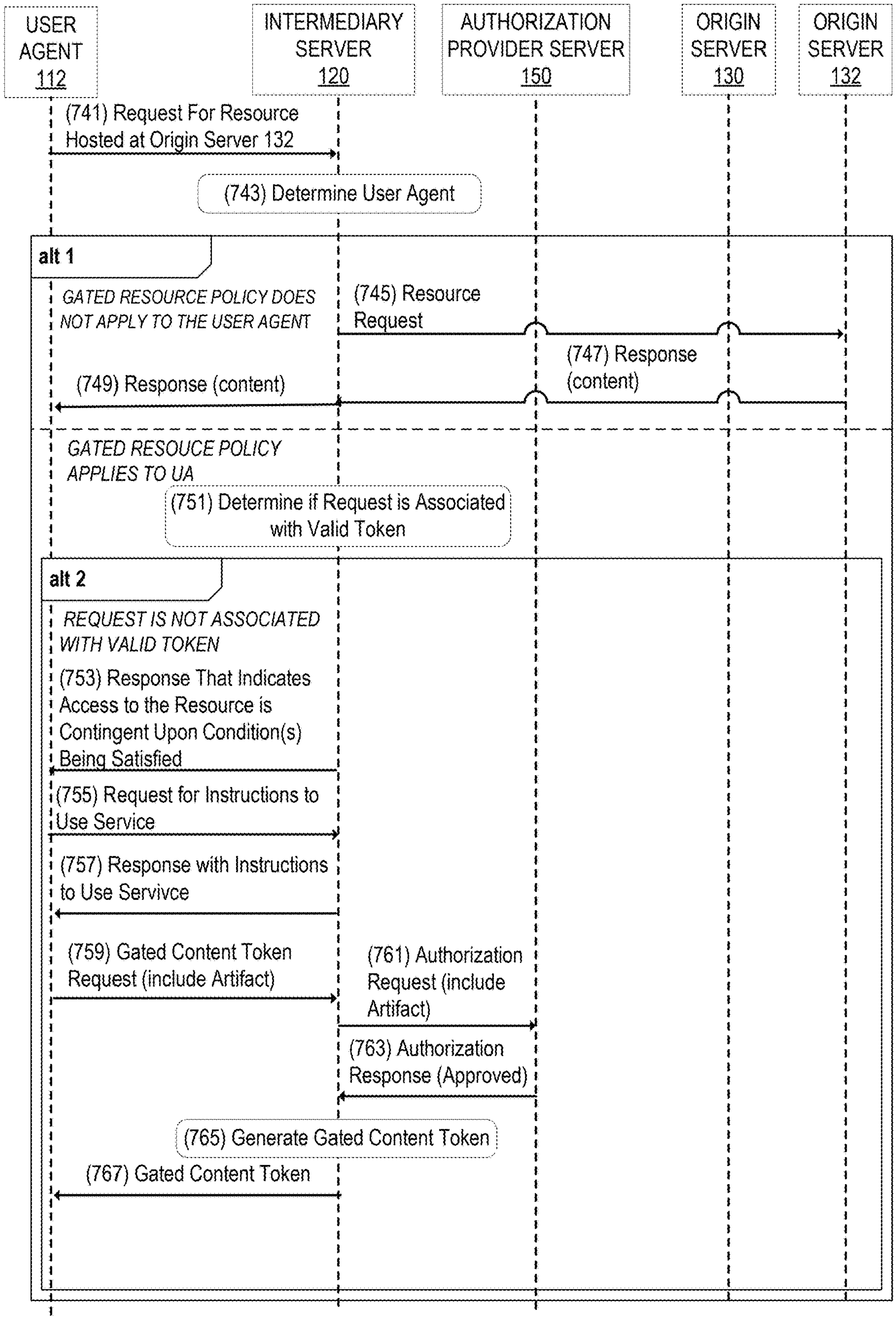
FIG. 7C is a third sequence diagram that illustrates exemplary operations for controlling access to internet resources for certain user agents upon one or more conditions being satisfied according to an embodiment.
Figure 7D:
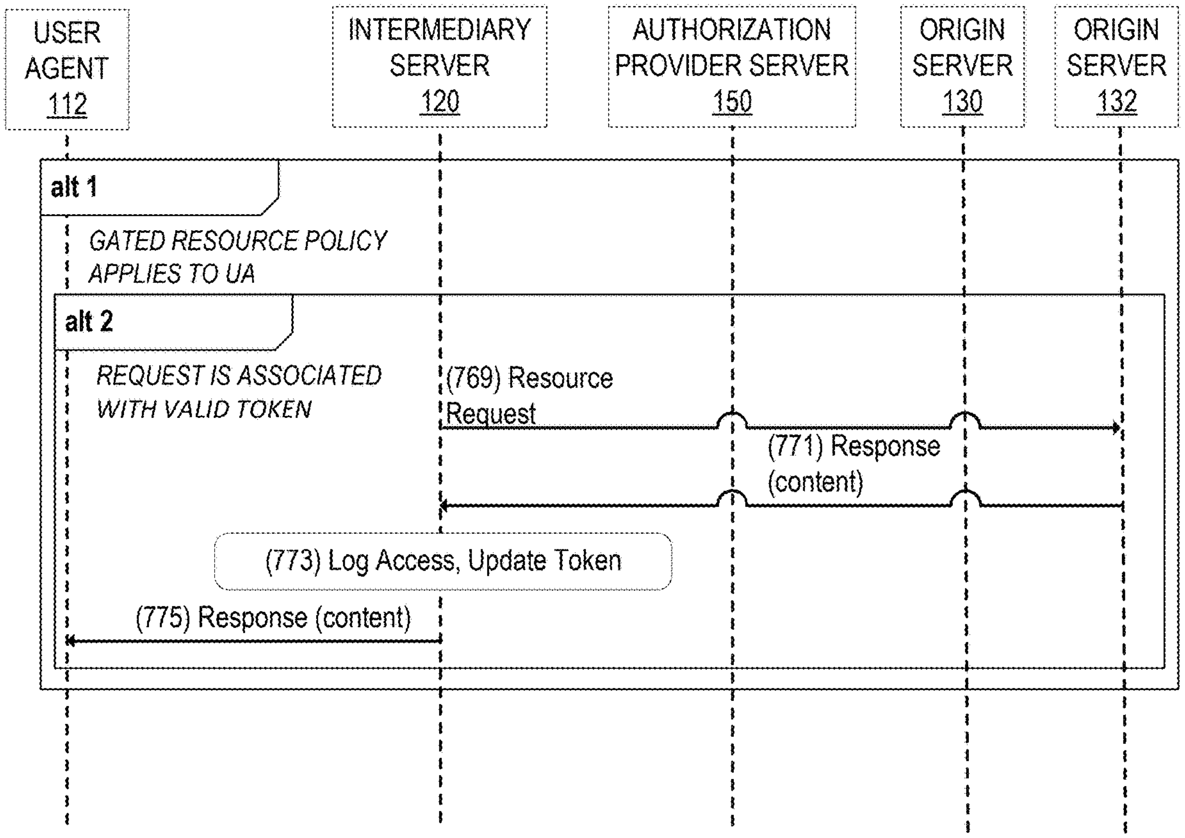
FIG. 7D is a fourth sequence diagram that illustrates exemplary operations for controlling access to internet resources for certain user agents upon one or more conditions being satisfied according to an embodiment.

The authorization artifact can be used for multiple resource owners. Thus, instead of needing to establish a relationship with each resource owner, the resource consumer can establish a single relationship with the authorization provider that applies to multiple resource owners. FIGS. 7C and 7D show operations where the user agent 112 is requesting access to a resource from a different hostname as FIGS. 7A and 7B and use the same authorization artifact.

At operation 741, the intermediary server 120 receives a request for a resource that is hosted at the origin server 132. This hostname is a different hostname from the hostname in the request in operation 701, and belongs to different resource owners. The resource can be a web page (e.g., HTML document), an image, a video, an audio file, a document file (e.g., PDF, word document, text document), a stylesheet (e.g., a CSS file), a script (e.g., a JavaScript), or other internet resource. At operation 743, the intermediary server 120 determines the user agent of the request, like as previously described. The intermediary server 120 may also determine the category of the user agent like as previously described.

The intermediary server 120 determines whether there is a gated resource policy that is applicable for the user agent for the requested resource. For instance, the intermediary server 120 analyzes the gated resource configuration 146 for the hostname of the request and determines whether a gated resource policy applies for the determined user agent. If a gated resource policy does not apply, the intermediary server 120 continues processing the request without further gated processing. For instance, the intermediary server 120 transmits a request for the resource to the origin server 132 at operation 745, and receives a response from the origin server 132 at operation 747 that includes the requested resource. The intermediary server 120 transmits a response to the user agent 112 that includes the requested resource at operation 749.

If a gated resource policy applies to the user agent for the requested resource, the intermediary server 120 determines if the request is associated with a valid gated resource token at operation 751 like as previously described. If the request is not associated with a valid token, then at operation 753, the intermediary server 120 transmits a response to the user agent 112 that indicates that access to the resource is contingent upon one or more conditions being satisfied (the gated resource response). This gated resource response can be different from the gated resource response transmitted in operation 713. For example, in an embodiment, the gated resource response is dynamically generated based on the gated resource configuration applicable for the hostname and/or the type or specific user agent making the request. For example, different resource owners can configure different conditions. As another example, a resource owner can configure different conditions for different user agents, or types of user agents, for the same hostname. As another example, the condition(s) described in the gated resource response can be generated using the condition tiers defined by the resource owner and the freshness of the resource, like as previously described.

At operation 755, the user agent 112 transmits a request that is received by the intermediary server 120 for the gated resource instructions file. At operation 757, the intermediary server 120 transmits the gated resource instructions file to the user agent 112. The gated resource instructions file includes instructions for establishing a relationship with a third-party authorization provider and how to use the service such as how to request a gated resource token. The gated resource instructions file may include a link to the token issuer.

If the resource consumer has already established a relationship with the authorization provider and received an authorization artifact, it does not need to establish another relationship and can use the same authorization artifact when requesting a gated resource token be generated. The user agent 112 is configured by the resource owner to transmit a request for a gated token to the gated resource token issuer 128 at operation 759. This request includes the authorization artifact generated by the authorization provider server 150. The acceptance of any condition term(s) may also be found in the request for the gated token. For instance, the request may include a header that indicates an acceptance of the one or more terms. Alternatively, the acceptance of the term(s) may be found in configuration UA operator configuration (e.g., pre-acceptance of certain term (s)).

The gated resource token issuer 128 uses the authorization artifact when determining whether condition(s) for access has been met. The gated content token issuer 128 transmits an authorization request to the authorization provider server 150 including the authorization artifact at operation 761. The authorization provider server 150 determines whether authorization is approved. At operation 763, the gated resource token issuer 128 receives an authorization response from the authorization provider server 150. In the example in FIG. 7A, the authorization was approved. The gated content token issuer 128 may enforce condition(s) that are in addition to, or in lieu of, the remote authorization condition. For example, if the gated resource policy includes an agreement regarding how the resource is allowed to be used, the gated content token issuer 128 determines whether the agreement has been agreed to by the resource consumer.

Assuming all condition(s) have been satisfied, the gated resource token issuer 128 generates a gated content token at operation 765. The gated resource token may be in the form of a JSON Web Token (JWT). The gated resource token may include one or more of the following: the hostname for which the token is valid, a token issuance timestamp, a token expiration timestamp, a user agent identifier, a number of times the token can be used, and a unique token identifier. The gated resource token may be signed. The gated resource token issuer 128 transmits the token to the user agent 112 at operation 767. As part of issuing the gated resource token, the gated resource token issuer 128 may cause the account(s) of the resource consumer and/or the resource provider to be updated at the authorization provider. For example, the gated resource token issuer 128 may cause funds to be transferred from the account of the resource consumer to the account of the resource owner, the amount of funds being specified in the gated resource policy. In another example, the gated resource token issuer 128 may cause funds to be transferred from the account of the resource consumer to the account of the provider of the gated token service. The gated resource token issuer 128 may log the generation of the gated resource token. This may include logging the time the token was generated, a unique transaction identifier, and an amount of any funds being transferred.

The user agent 112 can then transmit the request again with the gated resource token to access the resource. Referring to FIG. 7D, if the request in operation 741 is associated with a valid token, the intermediary server 120 retrieves the resource. Retrieving the resource may include retrieving the resource from the origin server 132 (e.g., transmitting the request to the origin server 132 and receiving a response containing the resource from the origin server 132) or retrieving the resource from cache that is available to the intermediary server 120. In the example shown in FIG. 7D, the intermediary server 120 transmits a request for the resource to the origin server 132 at operation 769, and receives a response from the origin server 132 that includes the requested resource at operation 771. The intermediary server 120 may log the access at operation 773. Logging the access may include logging the time of the access, the user agent making the request, the category of the user agent making the request, the zone of the resource, and the name or path of the resource. The intermediary server 120 may reflect the gated token usage at operation 773. For example, if the gated resource token is usage-based, the intermediary server 120 may cause data to be updated to reflect the current use (e.g., decrease the number of available uses remaining for the token). At operation 775, the intermediary server 120 transmits the retrieved resource to the user agent 112. In an embodiment, the intermediary server 120 transmits a modified resource to the user agent 112 instead of the original resource, as previously described.

Embodiments have been described where the control server is used to define access policies for the gated resource service. In an embodiment, the resource owner defines the access policy, and the condition(s) for access are dynamically provided by the origin server to the intermediary server for enforcement.

Figure 8:
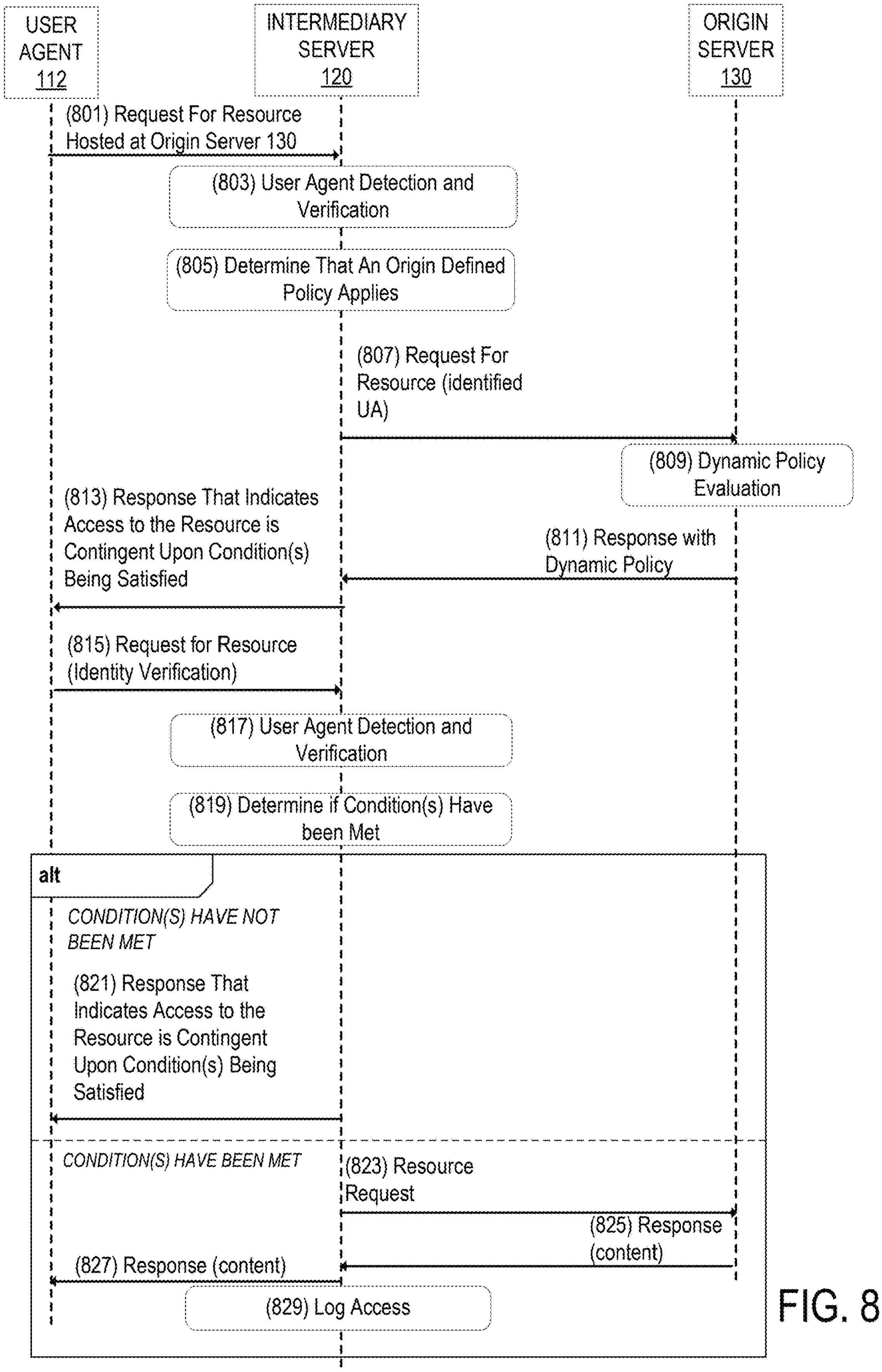
FIG. 8 illustrates exemplary operations for controlling access to internet resources for certain user agents upon one or more conditions being satisfied, where the one or more conditions are dynamically determined by the resource owner, according to an embodiment.

FIG. 8 illustrates exemplary operations for controlling access to internet resources for certain user agents upon one or more conditions being satisfied, where the one or more conditions are dynamically determined by the resource owner, according to an embodiment. To improve understanding, FIG. 8 streamlines the view by omitting the operations for the resource consumer to establish relationships with the authorization provider or the gated resource service provider. However, such operations may be performed like as described elsewhere herein.

At operation 801, The intermediary server 120 receives a request for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource.

At operation 803, the intermediary server 120 performs a user agent detection and verification process. The user agent detection and verification process may include determining whether the request includes information that allows the intermediary server 120 to verify the identity of the user agent of the request. For instance, the intermediary server 120 determines whether the request includes a signature header that includes a digital signature, and if so, validates the signature to verify the identity of the user agent. As another example, if a session identifier is used for verifying the identity of the user agent, the request handler 122 looks for the session identifier in the request, and if found, looks up stored session state to determine whether the identity of the user agent can be verified. If a verified identity of the user agent cannot be determined, the intermediary server 120 determines a predicted user agent of the request. For example, the user agent determiner 124 determines the predicted user agent of the request, like as previously described. The category of the user agent may also be predicted like as previously described.

The intermediary server 120 determines whether there is a gated resource policy that is applicable for the determined user agent (either predicted or verified) for the requested resource. In the example of FIG. 8, at operation 805 the intermediary server 120 determines that an origin-defined gated resource policy applies to the resource and the determined user agent. Although not shown in FIG. 8, if there was not a gated resource policy that applied, either origin-defined or service-defined, the intermediary server 120 would continue processing the request without further gated processing, such as retrieving the resource from cache or from the origin server.

Since there is an origin-defined gated resource policy that is applicable, the intermediary server 120 transmits the request for the resource to the origin server 130 at operation 807. This request can also include the identified user agent and/or the category of the identified user agent. In the example of FIG. 8, this request does not include an acceptance of any condition term(s). The origin server 130 receives the request and dynamically evaluates its policy for the requested resource and the requesting user agent 112.

The origin server 130 dynamically evaluates its policy for the requested resource and the requesting user agent at operation 809. This evaluation can include real-time data, internal quotas, and/or granular logic, to determine the condition(s) for access to the resource. The origin server 130 transmits a response to the intermediary server 120 at operation 811, which includes the dynamically determined policy details. The policy details may be in a custom HTTP header of the response.

The intermediary server 120 receives the response from the origin server 130 and extracts the dynamic policy details. Based on this retrieved dynamic policy, the intermediary server 120 transmits a gated resource response to the user agent at operation 813. The gated resource response may include the condition(s) for satisfying the origin-defined gated resource policy. Alternatively, or additionally, the condition(s) may be available through the control server 140 that can be accessed by the resource consumer.

The intermediary server 120 receives, from the user agent 112, the request for the resource at operation 815. This request includes information for verifying the identity of the user agent 112. At operation 817, the intermediary server 120 performs a user agent detection and verification process like as described in operation 803. For instance, in the case that signature verification, the intermediary server 120 determines whether the request includes a signature header that includes a digital signature, and if so, validates the signature to verify the identity of the user agent. As another example, if a session identifier is used for verifying the identity of the user agent, the request handler 122 looks for the session identifier in the request, and if found, looks up the stored session state to determine whether the identity of the user agent can be verified. In the example of FIG. 8, the intermediary server 120 verifies the identity of the user agent from the request in operation 815. This request may also include the acceptance of the condition(s) defined by the origin-defined policy.

At operation 819, the intermediary server 120 determines whether the one or more conditions of the gated resource policy have been met. Determining whether the one or more conditions have been met can include determining whether consent or acceptance of the condition term(s) has been made by or on behalf of the user agent. For instance, the acceptance of the term(s) may be included in a header of the request received in operation 815. Alternatively, the acceptance of the term(s) may be found in the UA operator configuration 148 (e.g., a pre-acceptance of one or more terms).

If the conditions have not been met, then operation 821 is performed where the intermediary server 120 transmits a response (a gated resource response) that indicates access to the resource is contingent upon one or more conditions being satisfied. This response is like the response sent in operation 813. If the conditions have been met, then access to the resource will be allowed by the intermediary server 120. The intermediary server 120 thus retrieves the resource. Retrieving the resource may include retrieving the resource from the origin server 130 (e.g., transmitting the request to the origin server 130 and receiving a response containing the resource from the origin server 130) or retrieving the resource from cache that is available to the intermediary server 120. In the example shown in FIG. 8, the intermediary server 120 transmits a request for the resource to the origin server 130 at operation 823, and receives a response from the origin server 130 that includes the requested resource at operation 825. The intermediary server 120 transmits a response that includes the requested resource to the user agent 112 at operation 827.

The intermediary server 120 may log the access at operation 829. Logging the access may include logging the time of the access, the user agent making the request, the category of the user agent making the request, the zone of the resource, and the name or path of the resource. The intermediary server 120 may also cause data of the accounts of the resource consumer and the resource owner to be updated (e.g., causing a value exchange from the resource consumer to the resource owner). For instance, the intermediary server 120 can transmit an authorization request to the authorization provider server 150 that includes the authorization artifact, and receive an authorization response that indicates whether authorization was approved.

The origin-defined policy enhances the flexibility of resource owners by allowing them to define access conditions in real-time, leveraging their own backend systems for policy decisions while still utilizing the intermediary server for enforcement and the centralized authorization provider for scalability.

In an embodiment, the resource owner defines the access policy, and the condition(s) for access are put into a zero-knowledge proof (ZKP) provided by the origin server to the intermediary server for enforcement. This allows the resource owner to dynamically set the origin-defined policy without disclosing the policy details to the gated resource service.

Figure 9:
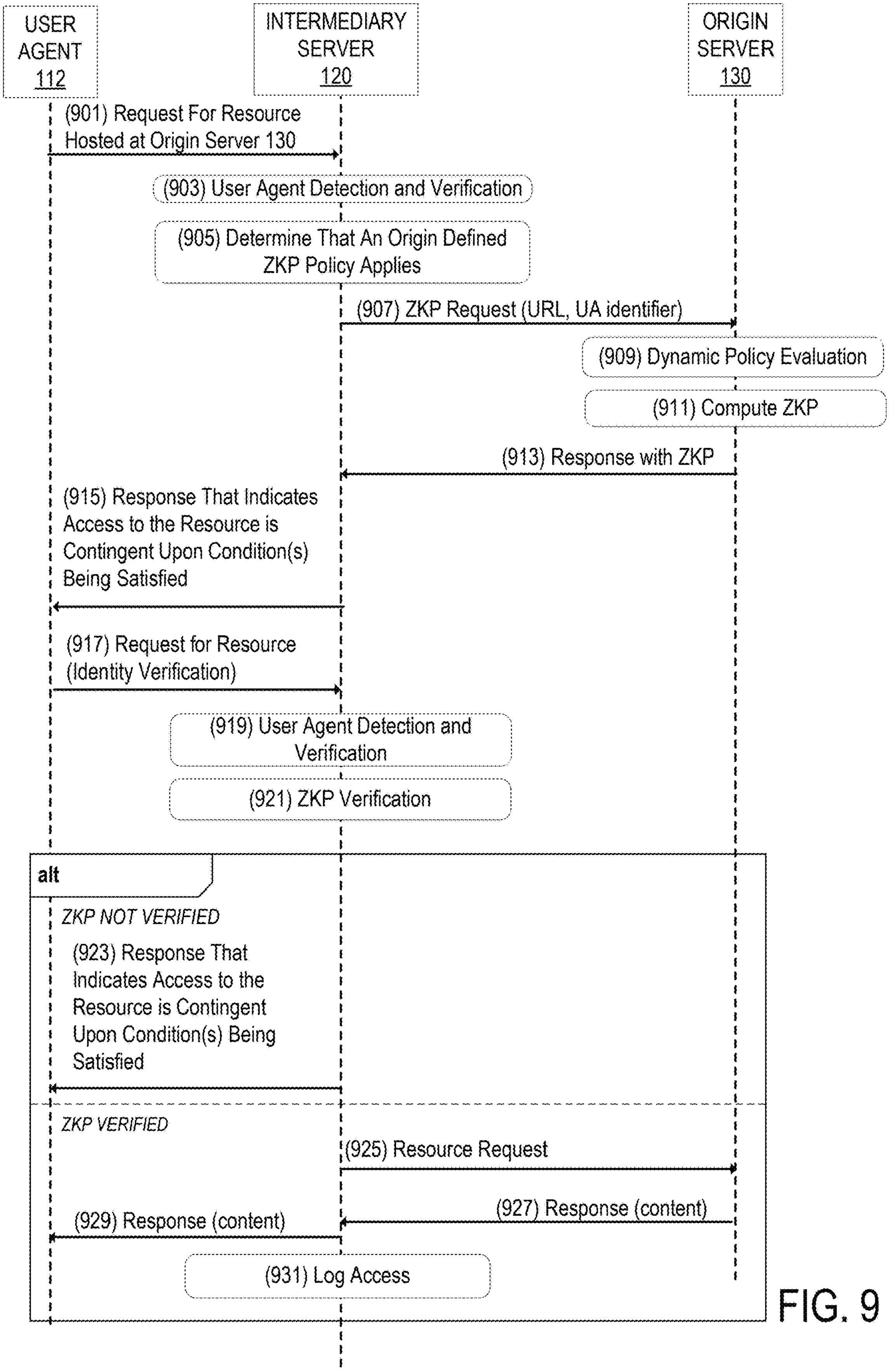
FIG. 9 illustrates exemplary operations for controlling access to internet resources for certain user agents upon one or more conditions being satisfied, where the one or more conditions are dynamically determined by the resource owner, and the gated resource service cryptographically enforces access based on a verifiable, but secret, policy fulfillment, according to an embodiment.

FIG. 9 illustrates exemplary operations for controlling access to internet resources for certain user agents upon one or more conditions being satisfied, where the one or more conditions are dynamically determined by the resource owner, and the gated resource service cryptographically enforces access based on a verifiable, but secret, policy fulfillment, according to an embodiment. To improve understanding, FIG. 9 streamlines the view by omitting the operations for the resource consumer to establish relationships with the authorization provider or the gated resource service provider. However, such operations may be performed like as described elsewhere herein.

At operation 901, The intermediary server 120 receives a request for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource.

At operation 903, the intermediary server 120 performs a user agent detection and verification process. The user agent detection and verification process may include determining whether the request includes information that allows the intermediary server 120 to verify the identity of the user agent of the request. For instance, the intermediary server 120 determines whether the request includes a signature header that includes a digital signature, and if so, validates the signature to verify the identity of the user agent. As another example, if a session identifier is used for verifying the identity of the user agent, the request handler 122 looks for the session identifier in the request, and if found, looks up stored session state to determine whether the identity of the user agent can be verified. If a verified identity of the user agent cannot be determined, the intermediary server 120 determines a predicted user agent of the request. For example, the user agent determiner 124 determines the predicted user agent of the request, like as previously described. The category of the user agent may also be predicted like as previously described.

The intermediary server 120 determines whether there is a gated resource policy that is applicable for the determined user agent (either predicted or verified) for the requested resource. In the example of FIG. 9, at operation 905 the intermediary server 120 determines that an origin-defined gated resource policy applies to the resource and that the resource owner has configured a ZKP policy enforcement, which has been configured at the gated resource service. Although not shown in FIG. 9, if there was not a gated resource policy that applied, either origin-defined or service-defined, the intermediary server 120 would continue processing the request without further gated processing, such as retrieving the resource from cache or from the origin server.

Since there is an origin-defined gated resource policy with ZKP policy enforcement that is applicable, the intermediary server 120 transmits a ZKP request to a predefined ZKP endpoint on the origin server 130 at operation 907. The ZKP request includes public inputs derived from the request from the user agent (e.g., resource URL, user agent identifier).

The origin server 130 acts as the ZKP prover. The origin server 130 dynamically evaluates its policy for the requested resource and the requesting user agent at operation 909. This evaluation can include real-time data, internal quotas, and/or granular logic, to determine the condition(s) for access to the resource. The condition(s) are used as private inputs, also known as witnesses, for the ZKP algorithm. The origin server computes a ZKP at operation 911, which cryptographically demonstrates that a specific public statement is true (e.g., "Given user_agent_ID X and resource_URL Y, and the condition(s) for access are met") without revealing any of its private policy details or internal logic. This generated ZKP is then cryptographically signed by the origin server 130 using its unique private key, whose public key may be pre-registered with the gated resource server. The signed ZKP is then transmitted back to the intermediary server 120 at operation 913.

The intermediary server 120, now possessing the signed ZKP from the origin server 130, transmits a gated resource response to the user agent 112 at operation 915. The intermediary server 120 receives, from the user agent 112, the request for the resource at operation 917. This request includes information for verifying the identity of the user agent 112. At operation 919, the intermediary server 120 performs a user agent detection and verification process like as described in operation 903. For instance, in the case that signature verification is being used, the intermediary server 120 determines whether the request includes a signature header that includes a digital signature, and if so, validates the signature to verify the identity of the user agent. As another example, if a session identifier is used for verifying the identity of the user agent, the request handler 122 looks for the session identifier in the request, and if found, looks up the stored session state to determine whether the identity of the user agent can be verified. In the example of FIG. 9, the intermediary server 120 verifies the identity of the user agent from the request in operation 917. This request may also include the acceptance of the condition(s) defined by the origin-defined policy without providing a hint about the condition(s) themselves.

The intermediary server 120 performs a ZKP verification at operation 921. It verifies the origin server's digital signature on the ZKP using the origin's corresponding public key. If the signature is valid, it then runs the ZKP verification algorithm on the ZKP using the public statement and public inputs. This cryptographically confirms that the origin server's secret policy conditions were satisfied, without revealing those policy conditions or the specific data that satisfied them.

If the ZKP is not verified, then the intermediary server 120 transmits a gated resource response at operation 923. If the ZKP is verified, which means that the condition(s) have been met, then the intermediary server 120 allows access to the resource. The intermediary server 120 thus retrieves the resource. Retrieving the resource may include retrieving the resource from the origin server 130 (e.g., transmitting the request to the origin server 130 and receiving a response containing the resource from the origin server 130) or retrieving the resource from cache that is available to the intermediary server 120. In the example shown in FIG. 9, the intermediary server 120 transmits a request for the resource to the origin server 130 at operation 925, and receives a response from the origin server 130 that includes the requested resource at operation 927. The intermediary server 120 transmits a response that includes the requested resource to the user agent 112 at operation 929.

The intermediary server 120 may log the access at operation 931. Logging the access may include logging the time of the access, the user agent making the request, the category of the user agent making the request, the zone of the resource, and the name or path of the resource. The intermediary server 120 may also cause data of the accounts of the resource consumer and the resource owner to be updated (e.g., causing a value exchange from the resource consumer to the resource owner). For instance, the intermediary server 120 can transmit an authorization request to the authorization provider server 150 that includes the authorization artifact, and receive an authorization response that indicates whether authorization was approved.

The ZKP embodiment shown in FIG. 9 provides resource owners with the ability to enforce highly confidential or proprietary access policies while still leveraging the gated resource service for global enforcement and scalability, all without compromising the secrecy of their internal policy logic.

Figure 10:
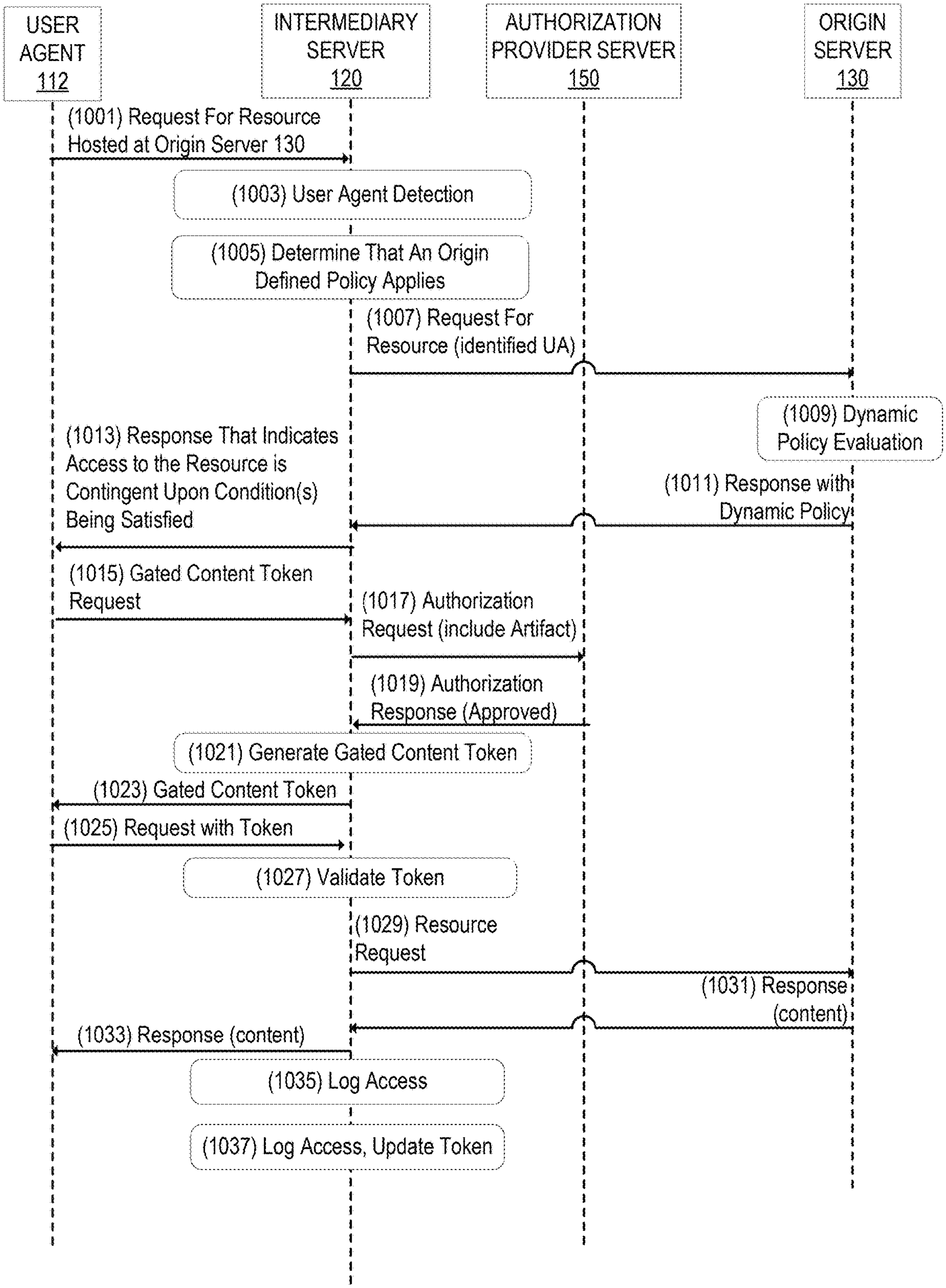
FIG. 10 illustrates exemplary operations for controlling access to internet resources for certain user agents upon one or more conditions being satisfied, where the one or more conditions are dynamically determined by the resource owner, according to an embodiment.

FIG. 10 illustrates exemplary operations for controlling access to internet resources for certain user agents upon one or more conditions being satisfied, where the one or more conditions are dynamically determined by the resource owner, according to an embodiment. To improve understanding, FIG. 10 streamlines the view by omitting the operations for the resource consumer to establish relationships with the authorization provider or the gated resource service provider. However, such operations may be performed like as described elsewhere herein. In the example of FIG. 10, a token based system is used.

At operation 1001, the intermediary server 120 receives a request for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource.

At operation 1003, the intermediary server 120 determines a predicted identity of the user agent of the request, like as previously described. The category of the user agent may also be predicted like as previously described. The intermediary server 120 determines whether there is a gated resource policy that is applicable for the determined user agent for the requested resource. In the example of FIG. 10, at operation 1005 the intermediary server 120 determines that an origin-defined gated resource policy applies to the resource and the determined user agent. Although not shown in FIG. 10, if there was not a gated resource policy that applied, either origin-defined or service-defined, the intermediary server 120 would continue processing the request without further gated processing, such as retrieving the resource from cache or from the origin server.

Since there is an origin-defined gated resource policy that is applicable, the intermediary server 120 transmits the request for the resource to the origin server 130 at operation 1007. This request can also include the identified user agent and/or the category of the identified user agent. In the example of FIG. 10, this request does not include an acceptance of any condition term(s).

The origin server 130 receives the request and dynamically evaluates its policy for the requested resource and the requesting user agent at operation 1009. This evaluation can include real-time data, internal quotas, and/or granular logic, to determine the condition(s) for access to the resource. The origin server 130 transmits a response to the intermediary server 120 at operation 1011, which includes the dynamically determined policy details. The policy details may be in a custom HTTP header of the response.

The intermediary server 120 receives the response from the origin server 130 and extracts the dynamic policy details. Based on this retrieved dynamic policy, the intermediary server 120 transmits a gated resource response to the user agent at operation 1013. The gated resource response may include the condition(s) for satisfying the origin-defined gated resource policy. Alternatively, or additionally, the condition(s) may be available through the control server 140 that can be accessed by the resource consumer.

FIG. 10 assumes that the resource consumer has already established a relationship with the authorization provider server 150 and received an authorization artifact, and received instructions on how to request a token be generated for access. The user agent 112 is configured by the resource owner to transmit a request for a gated token to the gated resource token issuer 128 at operation 1015. This request includes the authorization artifact generated by the authorization provider server 150. The acceptance of any condition term(s) may also be found in the request for the gated token. For instance, the request may include a header that indicates an acceptance of the one or more terms. Alternatively, the acceptance of the term(s) may be found in configuration UA operator configuration (e.g., pre-acceptance of certain term (s)).

The gated resource token issuer 128 uses the authorization artifact when determining whether condition(s) for access has been met. The gated content token issuer 128 transmits an authorization request to the authorization provider server 150 including the authorization artifact at operation 1017. The authorization provider server 150 determines whether authorization is approved. At operation 1019, the gated resource token issuer 128 receives an authorization response from the authorization provider server 150. In the example in FIG. 10, the authorization was approved. The gated content token issuer 128 may enforce condition(s) that are in addition to, or in lieu of, the remote authorization condition. For example, if the gated resource policy includes an agreement regarding how the resource is allowed to be used, the gated content token issuer 128 determines whether the agreement has been agreed to by the resource consumer.

Assuming all condition(s) have been satisfied, the gated resource token issuer 128 generates a gated content token at operation 1021. The gated resource token may be in the form of a JSON Web Token (JWT). The gated resource token may include one or more of the following: the hostname for which the token is valid, a token issuance timestamp, a token expiration timestamp, a user agent identifier, a number of times the token can be used, and a unique token identifier. The gated resource token may be signed. The gated resource token issuer 128 transmits the token to the user agent 112 at operation 1023. As part of issuing the gated resource token, the gated resource token issuer 128 may cause the account(s) of the resource consumer and/or the resource provider to be updated at the authorization provider. For example, the gated resource token issuer 128 may cause funds to be transferred from the account of the resource consumer to the account of the resource owner, the amount of funds being specified in the gated resource policy. In another example, the gated resource token issuer 128 may cause funds to be transferred from the account of the resource consumer to the account of the provider of the gated token service. The gated resource token issuer 128 may log the generation of the gated resource token. This may include logging the time the token was generated, a unique transaction identifier, and an amount of any funds being transferred.

The user agent 112 can then transmit the request again with the gated resource token to access the resource. Thus, at operation 1025, the intermediary server 120 receives, from the user agent 112, the request with the gated resource token. The intermediary server 120 validates the gated resource token at operation 1027. Determining whether the gated resource token is valid can include performing one or more of the following: determining whether the hostname in the token matches the hostname of the request; determining that the operative boundaries constraints of the token have not been violated, and determining that the signature of the gated resource token is valid. In the example of FIG. 10, the gated resource token is valid.

Because the gated resource token is valid, the intermediary server 120 retrieves the resource. Retrieving the resource may include retrieving the resource from the origin server 130 (e.g., transmitting the request to the origin server 130 and receiving a response containing the resource from the origin server 130) or retrieving the resource from cache that is available to the intermediary server 120. In the example shown in FIG. 10, the intermediary server 120 transmits a request for the resource to the origin server 130 at operation 1029, and receives a response from the origin server 132 that includes the requested resource at operation 1031. At operation 1033, the intermediary server 120 transmits the retrieved resource to the user agent 112. In an embodiment, the intermediary server 120 transmits a modified resource to the user agent 112 instead of the original resource, as previously described. The intermediary server 120 may log the access at operation 1035. Logging the access may include logging the time of the access, the user agent making the request, the category of the user agent making the request, the zone of the resource, and the name or path of the resource. The intermediary server 120 may reflect the gated token usage at operation 1037. For example, if the gated resource token is usage-based, the intermediary server 120 may cause data to be updated to reflect the current use (e.g., decrease the number of available uses remaining for the token).

Figure 11:
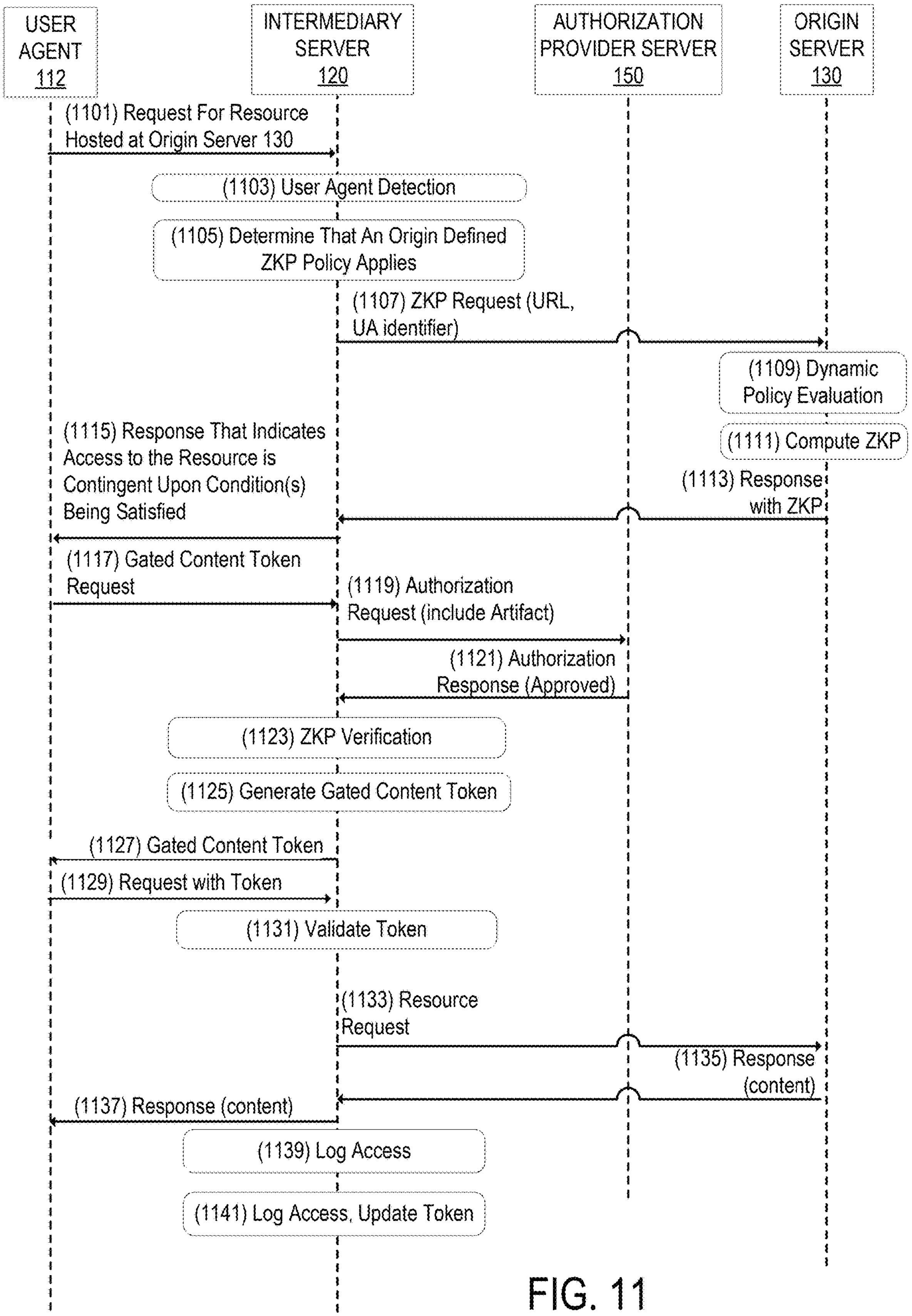
FIG. 11 illustrates exemplary operations for controlling access to internet resources. for certain user agents upon one or more conditions being satisfied, where the one or more conditions are dynamically determined by the resource owner, and the gated resource service cryptographically enforces access based on a verifiable, but secret, policy fulfillment, according to an embodiment.

FIG. 11 illustrates exemplary operations for controlling access to internet resources for certain user agents upon one or more conditions being satisfied, where the one or more conditions are dynamically determined by the resource owner, and the gated resource service cryptographically enforces access based on a verifiable, but secret, policy fulfillment, according to an embodiment. To improve understanding, FIG. 11 streamlines the view by omitting the operations for the resource consumer to establish relationships with the authorization provider or the gated resource service provider. However, such operations may be performed like as described elsewhere herein. In the example of FIG. 11, a token based system is used.

At operation 1101, the intermediary server 120 receives a request for a resource that is hosted at the origin server 130. The resource can be a web page (e.g., HTML document), an image, a video, an audio file, a document file (e.g., PDF, word document, text document), a stylesheet (e.g., a CSS file), a script (e.g., a JavaScript), or other internet resource.

At operation 1103, the intermediary server 120 determines a predicted identity of the user agent of the request, like as previously described. The category of the user agent may also be predicted like as previously described. The intermediary server 120 determines whether there is a gated resource policy that is applicable for the determined user agent for the requested resource. In the example of FIG. 11, at operation 1105 the intermediary server 120 determines that an origin-defined gated resource policy applies to the resource and that the resource owner has configured a ZKP policy enforcement, which has been configured at the gated resource service. Although not shown in FIG. 11, if there was not a gated resource policy that applied, either origin-defined or service-defined, the intermediary server 120 would continue processing the request without further gated processing, such as retrieving the resource from cache or from the origin server.

Since there is an origin-defined gated resource policy with ZKP policy enforcement that is applicable, the intermediary server 120 transmits a ZKP request to a predefined ZKP endpoint on the origin server 130 at operation 1107. The ZKP request includes public inputs derived from the request from the user agent (e.g., resource URL, user agent identifier).

The origin server 130 acts as the ZKP prover. The origin server 130 dynamically evaluates its policy for the requested resource and the requesting user agent at operation 1109. This evaluation can include real-time data, internal quotas, and/or granular logic, to determine the condition(s) for access to the resource. The condition(s) are used as private inputs, also known as witnesses, for the ZKP algorithm. The origin server computes a ZKP at operation 1111, which cryptographically demonstrates that a specific public statement is true (e.g., "Given user_agent_ID X and resource_URL Y, and the condition(s) for access are met") without revealing any of its private policy details or internal logic. This generated ZKP is then cryptographically signed by the origin server 130 using its unique private key, whose public key may be pre-registered with the gated resource server. The signed ZKP is then transmitted back to the intermediary server 120 at operation 1113.

The intermediary server 120, now possessing the signed ZKP from the origin server 130, transmits a gated resource response to the user agent 112 at operation 1115. FIG. 11 assumes that the resource consumer has already established a relationship with the authorization provider server 150 and received an authorization artifact, and received instructions on how to request a token be generated for access. The user agent 112 is configured by the resource owner to transmit a request for a gated token to the gated resource token issuer 128 at operation 1117. This request includes the authorization artifact generated by the authorization provider server 150. The acceptance of any condition term(s) may also be found in the request for the gated token. For instance, the request may include a header that indicates an acceptance of the one or more terms that does not provide a hint about the conditions themselves. Alternatively, the acceptance of the term(s) may be found in configuration UA operator configuration (e.g., pre-acceptance of certain term(s)).

The gated resource token issuer 128 uses the authorization artifact when determining whether condition(s) for access has been met. The gated content token issuer 128 transmits an authorization request to the authorization provider server 150 including the authorization artifact at operation 1119. The authorization provider server 150 determines whether authorization is approved. At operation 1121, the gated resource token issuer 128 receives an authorization response from the authorization provider server 150. In the example in FIG. 11, the authorization was approved.

The ZKP proof is communicated to the gated resource token issuer 128. The gated resource token issuer 128 performs a ZKP verification at operation 1123. It verifies the origin server's digital signature on the ZKP using the origin's corresponding public key. If the signature is valid, it then runs the ZKP verification algorithm on the ZKP using the public statement and public inputs. This cryptographically confirms that the origin server's secret policy conditions were satisfied, without revealing those policy conditions or the specific data that satisfied them.

If the ZKP is not verified, then the intermediary server 120 transmits a gated resource response that is similar to the response transmitted in operation 1115. If the ZKP is verified, which means that the condition(s) have been met, then the gated resource token issuer 128 generates a gated content token at operation 1125. The gated resource token may be in the form of a JSON Web Token (JWT). The gated resource token may include one or more of the following: the hostname for which the token is valid, a token issuance timestamp, a token expiration timestamp, a user agent identifier, a number of times the token can be used, and a unique token identifier. The gated resource token may be signed. The gated resource token issuer 128 transmits the token to the user agent 112 at operation 1127. As part of issuing the gated resource token, the gated resource token issuer 128 may cause the account(s) of the resource consumer and/or the resource provider to be updated at the authorization provider. For example, the gated resource token issuer 128 may cause funds to be transferred from the account of the resource consumer to the account of the resource owner, the amount of funds being specified in the gated resource policy. In another example, the gated resource token issuer 128 may cause funds to be transferred from the account of the resource consumer to the account of the provider of the gated token service. The gated resource token issuer 128 may log the generation of the gated resource token. This may include logging the time the token was generated, a unique transaction identifier, and an amount of any funds being transferred.

The user agent 112 can then transmit the request again with the gated resource token to access the resource. Thus, at operation 1129 the intermediary server 120 receives, from the user agent 112, the request with the gated resource token. The intermediary server 120 validates the gated resource token at operation 1131. Determining whether the gated resource token is valid can include performing one or more of the following: determining whether the hostname in the token matches the hostname of the request; determining that the operative boundaries constraints of the token have not been violated, and determining that the signature of the gated resource token is valid. In the example of FIG. 11, the gated resource token is valid.

Because the gated resource token is valid, the intermediary server 120 retrieves the resource. Retrieving the resource may include retrieving the resource from the origin server 130 (e.g., transmitting the request to the origin server 130 and receiving a response containing the resource from the origin server 130) or retrieving the resource from cache that is available to the intermediary server 120. In the example shown in FIG. 11, the intermediary server 120 transmits a request for the resource to the origin server 130 at operation 1133, and receives a response from the origin server 130 that includes the requested resource at operation 1135. At operation 1137, the intermediary server 120 transmits the retrieved resource to the user agent 112. In an embodiment, the intermediary server 120 transmits a modified resource to the user agent 112 instead of the original resource, as previously described. The intermediary server 120 may log the access at operation 1139. Logging the access may include logging the time of the access, the user agent making the request, the category of the user agent making the request, the zone of the resource, and the name or path of the resource. The intermediary server 120 may reflect the gated token usage at operation 1141. For example, if the gated resource token is usage-based, the intermediary server 120 may cause data to be updated to reflect the current use (e.g., decrease the number of available uses remaining for the token).

The ZKP embodiment shown in FIG. 11 provides resource owners with the ability to enforce highly confidential or proprietary access policies while still leveraging the gated resource service for global enforcement and scalability, all without compromising the secrecy of their internal policy logic.

Figure 12:
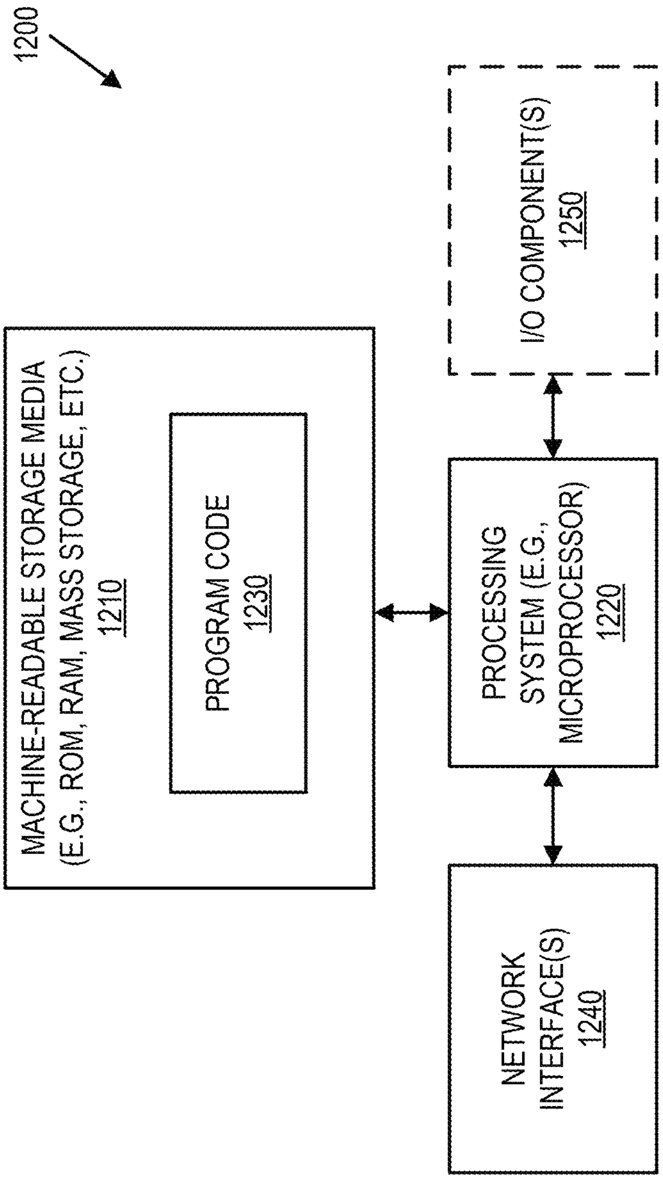
FIG. 12 is a block diagram illustrating a data processing system that can be used in an embodiment.

FIG. 12 illustrates a block diagram for an exemplary data processing system 1200 that may be used in some embodiments. One or more such data processing systems 1200 may be utilized to implement the embodiments and operations described with respect to the intermediary server 120 or other servers described herein. Data processing system 1200 includes a processing system 1220 (e.g., one or more processors and connected system components such as multiple connected chips).

The data processing system 1200 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 1210 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 1220. For example, the depicted machine-readable storage media 1210 may store program code 1230 that, when executed by the processing system 1220, causes the data processing system 1200 to execute the request handler 122, the gated resource token issuer 128, and/or any of the operations described herein.

The data processing system 1200 also includes one or more network interfaces 1240 (e.g., a wired and/or wireless interfaces) that allows the data processing system 1200 to transmit data and receive data from other computing devices, typically across one or more networks (e.g., Local Area Networks (LANs), the Internet, etc.). The data processing system 1200 may also include one or more input or output ("I/O") components 1250 such as a mouse, keypad, keyboard, a touch panel or a multi-touch input panel, camera, frame grabber, optical scanner, an audio input/ output subsystem (which may include a microphone and/or a speaker), other known I/O devices or a combination of such I/O devices. Additional components, not shown, may also be part of the system 1200, and, in certain embodiments, fewer components than that shown in One or more buses may be used to interconnect the various components shown in FIG. 12.

The techniques shown in the figures can be implemented using code and data stored and executed on one or more electronic devices (e.g., an intermediary server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:

receiving a first request for an internet resource hosted at an origin server, the first request received from a user agent;

determining that the first request does not include a session identifier usable to verify an identity of a user agent associated with the first request;

determining a predicted identity of the user agent of the first request;

determining that a gated resource policy is applicable to the internet resource and the predicted identity of the user agent, wherein the gated resource policy is used for controlling access to the internet resource for certain user agents, including the predicted identity of the user agent of the first request, based on one or more conditions being satisfied;

transmitting a first response to the user agent that indicates access to the internet resource is contingent upon the one or more conditions being satisfied;

receiving a second request for the internet resource hosted at the origin server, wherein the second request includes a session identifier;

verifying the identity of the user agent by validating the session identifier included in the second request against a stored session state;

enforcing the gated resource policy including determining that the one or more conditions have been satisfied by the verified user agent;

transmitting a third request for the internet resource to the origin server;

receiving a second response that includes the internet resource from the origin server; and transmitting a third response that includes the internet resource to the user agent.

2. The method of claim 1, wherein the one or more conditions are specified in the first response.

3. The method of claim 1, wherein the one or more conditions are dynamically generated based at least in part on how recently the internet resource was created or updated.

4. The method of claim 1, wherein the internet resource included in the third response is modified to remove at least any images, any videos, any style sheets, and any scripts from the internet resource included in the second response.

5. The method of claim 1, wherein the one or more conditions include an agreement of one or more terms between an owner or operator of the user agent and an owner of the internet resource.

6. The method of claim 5, wherein the second request further includes an acceptance of the one or more terms.

7. The method of claim 1, wherein the session identifier is transmitted to the user agent after successful authentication, and wherein the session identifier is transmitted in a cookie.

8. One or more non-transitory computer-readable storage mediums that, if executed by one or more processing systems, will cause the one or more processing systems to perform operations, comprising:

receiving a first request for an internet resource hosted at an origin server, the first request received from a user agent;

determining that the first request does not include a session identifier usable to verify an identity of a user agent associated with the first request;

determining a predicted identity of the user agent of the first request;

determining that a gated resource policy is applicable to the internet resource and the predicted identity of the user agent, wherein the gated resource policy is used for controlling access to the internet resource for certain user agents, including the predicted identity of the user agent of the first request, based on one or more conditions being satisfied;

transmitting a first response to the user agent that indicates access to the internet resource is contingent upon the one or more conditions being satisfied;

receiving a second request for the internet resource hosted at the origin server, wherein the second request includes a session identifier;

verifying the identity of the user agent by validating the session identifier included in the second request against a stored session state;

enforcing the gated resource policy including determining that the one or more conditions have been satisfied by the verified user agent;

transmitting a third request for the internet resource to the origin server;

receiving a second response that includes the internet resource from the origin server; and transmitting a third response that includes the internet resource to the user agent.

9. The one or more non-transitory computer-readable storage mediums of claim 8, wherein the one or more conditions are specified in the first response.

10. The one or more non-transitory computer-readable storage mediums of claim 8, wherein the one or more conditions are dynamically generated based at least in part on how recently the internet resource was created or updated.

11. The one or more non-transitory computer-readable storage mediums of claim 8, wherein the internet resource included in the third response is modified to remove at least any images, any videos, any style sheets, and any scripts from the internet resource included in the second response.

12. The one or more non-transitory computer-readable storage mediums of claim 8, wherein the one or more conditions include an agreement of one or more terms between an owner or operator of the user agent and an owner of the internet resource.

13. The one or more non-transitory computer-readable storage mediums of claim 12, wherein the second request further includes an acceptance of the one or more terms.

14. The one or more non-transitory computer-readable storage mediums of claim 8, wherein the session identifier is transmitted to the user agent after successful authentication, and wherein the session identifier is transmitted in a cookie.

15. A server system, comprising:

one or more processing systems; and one or more non-transitory machine-readable storage mediums that stores instructions that, when executed by the one or more processing systems, causes the server system to perform operations including:

receiving a first request for an internet resource hosted at an origin server, the first request received from a user agent;

determining that the first request does not include a session identifier usable to verify an identity of a user agent associated with the first request;

determining a predicted identity of the user agent of the first request;

determining that a gated resource policy is applicable to the internet resource and the predicted identity of the user agent, wherein the gated resource policy is used for controlling access to the internet resource for certain user agents, including the predicted identity of the user agent of the first request, based on one or more conditions being satisfied;

transmitting a first response to the user agent that indicates access to the internet resource is contingent upon the one or more conditions being satisfied;

receiving a second request for the internet resource hosted at the origin server, wherein the second request includes a session identifier;

verifying the identity of the user agent by validating the session identifier included in the second request against a stored session state;

enforcing the gated resource policy including determining that the one or more conditions have been satisfied by the verified user agent;

transmitting a third request for the internet resource to the origin server;

receiving a second response that includes the internet resource from the origin server; and transmitting a third response that includes the internet resource to the user agent.

16. The server system of claim 15, wherein the one or more conditions are specified in the first response.

17. The server system of claim 15, wherein the one or more conditions are dynamically generated based at least in part on how recently the internet resource was created or updated.

18. The server system of claim 15, wherein the internet resource included in the third response is modified to remove at least any images, any videos, any style sheets, and any scripts from the internet resource included in the second response.

19. The server system of claim 15, wherein the one or more conditions include an agreement of one or more terms between an owner or operator of the user agent and an owner of the internet resource.

20. The server system of claim 19, wherein the second request further includes an acceptance of the one or more terms.

21. The server system of claim 15, wherein the session identifier is transmitted to the user agent after successful authentication, and wherein the session identifier is transmitted in a cookie.

* * * * *